(12) United States Patent
Shah et al.

(10) Patent No.: US 11,514,213 B2
(45) Date of Patent: Nov. 29, 2022

(54) CUSTOMIZED FINITE ELEMENT MODEL FOR CRASH TEST DUMMY

(71) Applicant: Humanetics Innovative Solutions, Inc., Farmington Hills, MI (US)

(72) Inventors: Chirag Shah, South Lyon, MI (US); Suraush Khambati, Poughkeepsie, NY (US); Shiva Shetty, Lake Orion, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 117 days.

(21) Appl. No.: 17/195,308

(22) Filed: Mar. 8, 2021

(65) Prior Publication Data

US 2021/0192110 A1 Jun. 24, 2021

Related U.S. Application Data

(63) Continuation-in-part of application No. 15/942,200, filed on Mar. 30, 2018, now Pat. No. 11,244,088, and a continuation-in-part of application No. 15/747,979, filed as application No. PCT/US2016/049414 on Aug. 30, 2016, now Pat. No. 10,943,510.

(Continued)

(51) Int. Cl.
*G06F 30/23* (2020.01)
*G06F 30/12* (2020.01)
*G06T 17/20* (2006.01)
*G06F 111/16* (2020.01)

(52) U.S. Cl.
CPC ............. *G06F 30/23* (2020.01); *G06F 30/12* (2020.01); *G06T 17/20* (2013.01); *G06F 2111/16* (2020.01)

(58) Field of Classification Search
CPC ...... G06F 30/23; G06F 30/12; G06F 2111/16; G06F 30/15; G06F 21/577; G06F 30/17; G06F 17/5086; G06F 17/5018; G06T 17/20; G05B 17/02; G06N 20/00; G16H 50/50; G01N 3/00; G01N 3/48; G09B 23/32; G09B 23/30

See application file for complete search history.

(56) References Cited

U.S. PATENT DOCUMENTS 3,757,431 A 9/1973 Daniel
4,261,113 A 4/1981 Alderson
(Continued)

OTHER PUBLICATIONS

Untaroiu, C.D. et al., "Assessment of a Dummy Model in Crash Simulations Using Rating Methods", 2012, 12 pages.
(Continued)

*Primary Examiner* — Brandi N Hopkins
(74) *Attorney, Agent, or Firm* — Howard & Howard Attorneys PLLC

(57) ABSTRACT

Systems and methods for creating a customizable dummy finite element model for a dummy hardware model. First finite element factor profiles for the dummy hardware model that match certification corridors for the dummy hardware model are identified, a mapping function based on the first finite element factor profiles that allows second finite element model profiles for the dummy hardware model to be interpolated from the first finite element factor profiles is defined, and a customizable dummy finite element model for the dummy hardware model that incorporates the mapping function is generated.

20 Claims, 10 Drawing Sheets

Related U.S. Application Data

(60) Provisional application No. 62/481,510, filed on Apr. 4, 2017, provisional application No. 62/481,545, filed on Apr. 4, 2017, provisional application No. 62/212,119, filed on Aug. 31, 2015.

(56) References Cited

U.S. PATENT DOCUMENTS

| | | | |
|---|---|---|---|
| 4,701,132 | A | 10/1987 | Groesch et al. |
| 5,317,931 | A | 6/1994 | Kalami |
| 7,086,273 | B2 | 8/2006 | Lipmyer |
| 7,508,530 | B1 | 3/2009 | Handman |
| 8,086,430 | B2 * | 12/2011 | Thomas ............... G06F 30/15 703/8 |
| 8,407,033 | B2 | 3/2013 | Cooper et al. |
| 9,043,187 | B2 | 5/2015 | Pang |
| 9,355,575 | B2 | 5/2016 | Wang |
| 10,229,616 | B2 | 3/2019 | Khambati et al. |
| 10,943,510 | B2 | 3/2021 | Khambati et al. |
| 2004/0099825 | A1 | 5/2004 | Huang et al. |
| 2006/0095235 | A1 | 5/2006 | Furtado et al. |
| 2011/0144955 | A1 * | 6/2011 | Cooper ............... G06F 30/15 703/1 |
| 2011/0197688 | A1 | 8/2011 | Forbes et al. |
| 2012/0173213 | A1 * | 7/2012 | Pang ................ G06F 30/23 703/2 |
| 2013/0327164 | A1 | 12/2013 | Wang |
| 2017/0061829 | A1 | 3/2017 | Khambati et al. |
| 2018/0285516 | A1 | 10/2018 | Shah |

OTHER PUBLICATIONS

International Preliminary Report on Patentability (PCT/US16/49414); dated Aug. 24, 2017.
International Preliminary Report on Patentability (PCT/US16/49414); dated Mar. 5, 2018.
International Search Report and Written Opinion (PCT/US2016/049414); dated Nov. 23, 2016.
Maatouki, "Latest Developments of LS-Dynatest Dummy Models", Oct. 2014 [retrieved on Oct. 19, 2016]. Retrieved from the Internet:https://www.dynamore.se/en/resources/papers/2014-nordic-is-dyna-forum-201-3-presentations/latest-developments-of-is-dyna-test-dummy-models>, entire document.

\* cited by examiner

| Injury Output Measurement From Inverse Impact Test | | | Example of Parameter Value from Hardware Testing |
|---|---|---|---|
| Parameter (Measurement Unit) | | Name | |
| T1 (Nm) | 76A | Upper Tibia Moment | 78A 256.16 |
| T2 (Nm) | 76B | Mid Upper Tibia Moment | 78B 238.24 |
| T3 (Nm) | 76C | Mid Lower Tibia Moment | 78C 175.21 |
| T4 (Nm) | 76D | Lower Tibia Moment | 78D 104.92 |
| ACL (mm) | 76E | Anterior Cruciate Ligament | 78E 9.69 |
| PCL (mm) | 76F | Posterior Cruciate Ligament | 78F 4.94 |
| MCL (mm) | 76G | Medial Collateral Ligament | 78G 20.53 |

| | FE Factors For Customized Response FLEX-PLI Model (Factor) | | | | | |
|---|---|---|---|---|---|---|
| Legend (Factor) | | Name | Minimum Value | | Maximum Value | |
| A ($X_1$) | 84A | Tibia Bone Core Material Property | -1.5 | 86A | 1.5 | 88A |
| B ($X_2$) | 84B | Inner/Outer Knee Spring Stiffness | -3 | 86B | 3 | 88B |
| C ($X_3$) | 84C | Friction Between Neoprene and Rubber | -1 | 86C | 1 | 88C |
| D ($X_4$) | 84D | Friction Between Neoprene and Hardware | -1 | 86D | 1 | 88D |
| E ($X_5$) | 84E | Friction Between Femur Block and Meniscus | -2 | 86E | 2 | 88E |

FIG. 5

| Legend (Parameter) | Name | Mapping Function Equation |
|---|---|---|
| T1 (Y₁) 96A | Upper Tibia Moment | T1 = 256.157 + 25.603*A + 2.698*B - 2.944*C - 4.175*D + 1.254*E - 0.497*A*B + 0.223*A*C + 0.086*A*D - 0.108*A*E + 0.404*B*C + 1.141*B*D + 3.421*B*E - 2.106*C*D + 0.510*C*E + 0.528*D*E  98A |
| T2 (Y₂) 96B | Mid Upper Tibia Moment | T2 = 238.237 + 18.347*A + 4.798*B - 3.571*C - 3.815*D - 1.091*E + 1.547*A*B + 0.499*A*C + 0.556*A*D - 1.679*A*E - 0.174*B*C - 0.824*B*D + 1.350*B*E - 1.839*C*D - 0.427*C*E + 0.974*D*E  98B |
| T3 (Y₃) 96C | Mid Lower Tibia Moment | T3 = 175.206 + 12.374*A + 6.464*B - 4.228*C + 0.035*D - 3.548*E + 0.043*A*B - 0.171*A*C + 0.030*A*D + 0.068*A*E - 0.111*B*C + 0.180*B*D - 1.670*B*E - 1.460*C*D + 1.126*C*E - 0.191*D*E  98C |
| T4 (Y₄) 96D | Lower Tibia Moment | T4 = 104.918 + 5.141*A + 2.698*B - 3.407*C + 1.661*D + 0.576*E - 0.777*A*B + 0.567*A*C - 0.238*A*D - 0.275*A*E - 0.054*B*C + 0.099*B*D + 0.875*B*E - 1.797*C*D + 0.853*C*E - 0.276*D*E  98D |
| ACL (Y₅) 96E | Anterior Cruciate Ligament | ACL = 9.693 - 0.213*A - 0.119*B + 0.054*C - 0.4*D - 0.24*E + 0.024*A*B + 0.03*A*C - 0.178*A*D + 0.056*A*E - 0.008*B*D - 0.081*C*D + 0.376*D*E  98E |
| PCL (Y₆) 96F | Posterior Cruciate Ligament | PCL = 4.941 + 0.029*A + 0.089*B + 0.086*C - 0.182*D - 0.418*E - 0.099*A*B + 0.09*A*C + 0.106*A*D + 0.089*A*E + 0.066*B*D - 0.05*C*D + 0.401*D*E  98F |
| MCL (Y₇) 96G | Medial Collateral Ligament | MCL = 20.5272 - 0.2854*A - 1.9109*B - 0.4639*C - 0.206*D - 0.0041*E + 0.0544*A*B + 0.0658*A*C + 0.0729*A*D - 0.0959*A*E - 0.0542*B*C - 0.0209*B*D - 0.051*B*E + 0.0513*C*D - 0.0093*C*E - 0.0049*D*E  98G |

| CAE Run Number | Input Factors* | | | | |
|---|---|---|---|---|---|
| | A ($X_1$) | B ($X_2$) | C ($X_3$) | D ($X_4$) | E ($X_5$) |
| 1 | -1 | -1 | 1 | 1 | 1 |
| 2 | 1 | -1 | -1 | -1 | 1 |
| 3 | 1 | 1 | -1 | 1 | 1 |
| 4 | -1 | 1 | -1 | -1 | -1 |
| 5 | -1 | -1 | 1 | 1 | -1 |
| 6 | 1 | 1 | 1 | 1 | -1 |
| 7 | 1 | -1 | 1 | 1 | 1 |
| 8 | 1 | 1 | -1 | -1 | 1 |
| 9 | -1 | -1 | 1 | -1 | -1 |
| 10 | 1 | 1 | 1 | -1 | -1 |
| 11 | 1 | 1 | 1 | 1 | 1 |
| 12 | -1 | 1 | 1 | 1 | -1 |
| 13 | -1 | -1 | -1 | -1 | -1 |
| 14 | 1 | -1 | 1 | -1 | -1 |
| 15 | 1 | -1 | -1 | 1 | 1 |
| 16 | -1 | 1 | 1 | 1 | 1 |
| 17 | -1 | -1 | -1 | 1 | -1 |
| 18 | 1 | 1 | -1 | 1 | -1 |
| 19 | -1 | -1 | -1 | 1 | 1 |
| 20 | 1 | -1 | 1 | -1 | 1 |
| 21 | 1 | 1 | 1 | -1 | 1 |
| 22 | -1 | 1 | -1 | 1 | 1 |
| 23 | 1 | 1 | -1 | -1 | -1 |
| 24 | 1 | -1 | -1 | 1 | -1 |
| 25 | -1 | -1 | -1 | -1 | 1 |
| 26 | -1 | 1 | -1 | -1 | 1 |
| 27 | -1 | -1 | 1 | -1 | 1 |
| 28 | 1 | -1 | -1 | -1 | -1 |
| 29 | 1 | -1 | 1 | 1 | -1 |
| 30 | -1 | 1 | 1 | -1 | -1 |
| 31 | -1 | 1 | 1 | -1 | 1 |
| 32 | -1 | 1 | -1 | 1 | -1 |
| *Note: Factors are coded units: -1 represents the lower limit (minimum) and 1 the upper limit (maximum) | | | | | |

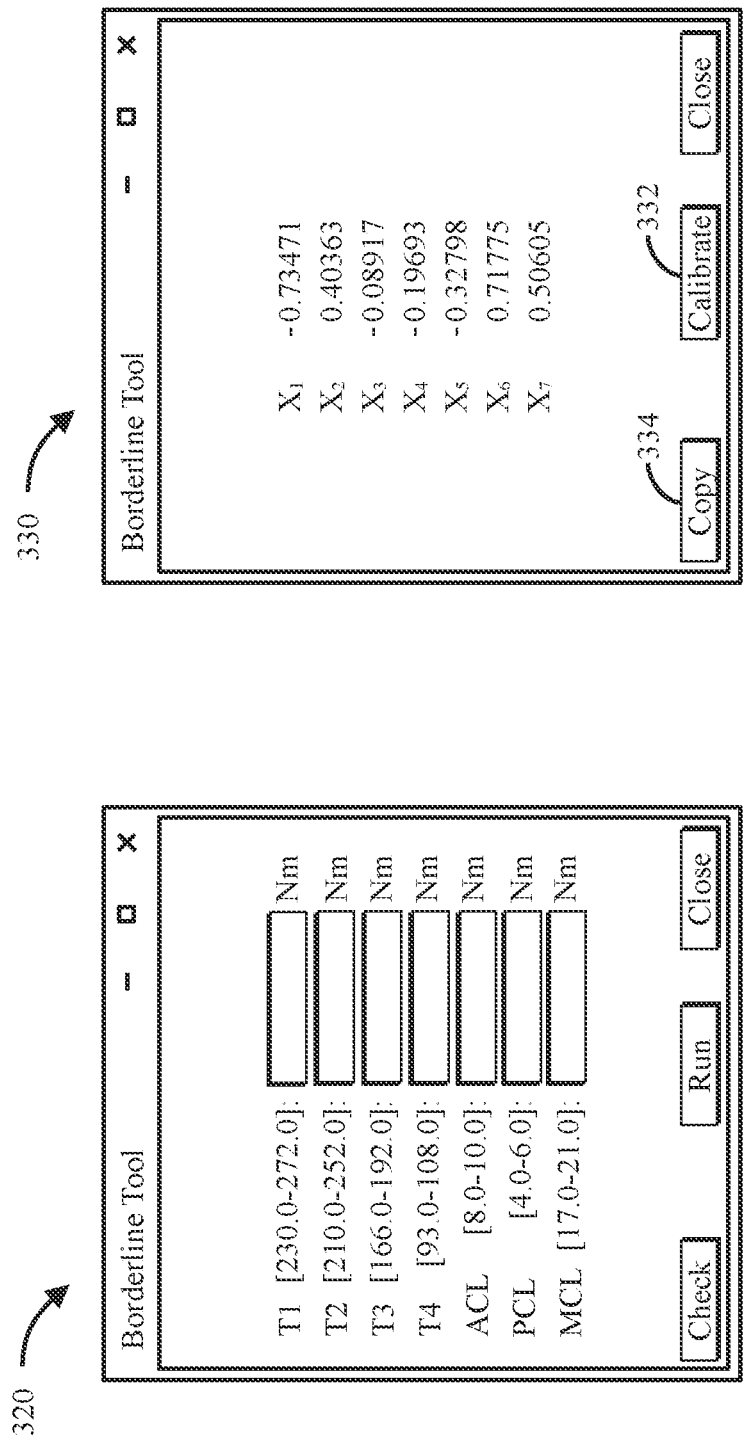

CUSTOMIZED FINITE ELEMENT MODEL FOR CRASH TEST DUMMY

RELATED APPLICATIONS

This application is a continuation-in-part of U.S. patent application Ser. No. 15/747,979 filed Jan. 26, 2018, which is a national stage entry of International Application No. PCT/US2016/049414 filed Aug. 30, 2016, which claims the benefit of U.S. Provisional Application No. 62/212,119 filed Aug. 31, 2015. This application is also a continuation-in-part of U.S. patent application Ser. No. 15/942,200 filed Mar. 30, 2018, which claims the benefit of U.S. Provisional Application No. 62/481,545 filed Apr. 4, 2017 and U.S. Provisional Application No. 62/481,510 filed Apr. 4, 2017. The disclosures of the above applications are hereby incorporated by reference herein in their entirety.

BACKGROUND

Automotive, aviation, and other vehicle manufacturers conduct a wide variety of collision testing to measure the effects of a collision on a vehicle and its occupants. Through collision testing, vehicle manufacturers gain valuable information that can be used to improve vehicles, authorities examine vehicles to evaluate whether to grant type approval, and consumer organizations generate vehicle safety ratings for the public.

Collision testing often involves the use of anthropomorphic test devices, better known as "crash test dummies," to estimate a human's injury risk. The crash test dummy possesses the general mechanical properties, dimensions, masses, joints, and joint stiffness of the humans of interest. In addition, they possess sufficient mechanical impact response similitude and sensitivity to cause them to interact with the vehicle's interior and exterior in a human-like manner.

Prior to fabricating a proposed vehicle design, it is desirable to predict how a crash test dummy will respond to a collision test involving the design. Such predictions enable vehicle manufactures to identify and make necessary changes to the proposed vehicle design before spending time, labor, and material resources on fabrication.

SUMMARY

In one example, a method for creating a customizable dummy finite element model for a dummy hardware model includes identifying first finite element factor profiles for the dummy hardware model that match certification corridors for the dummy hardware model, defining a mapping function based on the first finite element factor profiles that allows second finite element factor profiles for the dummy hardware model to be interpolated from the first finite element factor profiles, and generating a customizable dummy finite element model for the dummy hardware model that incorporates the mapping function.

In one example, a system for creating a customizable dummy finite element model for a dummy hardware model includes at least one processor configured to identify first finite element factor profiles for the dummy hardware model that match certification corridors for the dummy hardware model, define a mapping function based on the first finite element factor profiles that allows second finite element factor profiles for the dummy hardware model to be interpolated from the first finite element factor profiles, and generate a customizable dummy finite element model for the dummy hardware model that incorporates the mapping function.

In one example, a computer program product includes a non-transitory computer readable storage medium and a customizable dummy finite element model for a dummy hardware model stored on the non-transitory computer readable storage medium. The stored customizable dummy finite element model includes a mesh for the dummy hardware model, finite element factors that define attributes of the mesh, a mapping function that indicates a response of the customizable dummy finite element model at a certification level as a function of the finite element factors, and computer-executable instructions that, upon execution by a processor, causes the processor to receive a user input parameter for the customizable dummy finite element model that defines a target response for the customizable dummy finite element model at the certification level, determine values for the finite element factors that correspond to the target response using the mapping function, and apply the determined values to the customizable dummy finite element model to generate a customized finite element model corresponding to the target response.

BRIEF DESCRIPTION OF THE DRAWINGS

FIG. 4 illustrates a certification response that may be generated and stored by the system of FIG. 1 for the pedestrian type crash test dummy hardware model of FIG. 3.

FIG. 5 illustrates finite element factor data that may be generated and stored by the system of FIG. 1 for the pedestrian type crash test dummy hardware model of FIG. 3.

FIG. 6 illustrates a mapping function that may be generated and stored by the system of FIG. 1 for a customizable dummy finite element model corresponding to the pedestrian type crash test dummy hardware model of FIG. 3.

FIG. 10 illustrates a user interface for submitting a target certification response for customizing a customizable dummy finite element model.

FIG. 11 illustrates a user interface indicating optimal finite element factor values for a customizable dummy finite element model that correspond to a target certification response submitted for the customizable dummy finite element model.

DETAILED DESCRIPTION

To predict how a crash test dummy will respond in a collision test involving a proposed vehicle design, a dummy finite element model ("FEM") specific to the crash test dummy may be inserted into a finite element model of the proposed vehicle design. The combined model may then be subjected to simulated collision testing. The response exhibited by the dummy FEM specific to the crash test dummy from the simulated collision testing may predict how the crash test dummy will respond to a real-world collision test involving the proposed vehicle design.

Variability may be seen in the responses of multiple instances of a same crash test dummy hardware model in certification, sled, and vehicle testing due to differences in materials, manufacturing, environment, and age. A dummy FEM specific to one instance of a given dummy hardware model may thus not accurately predict the response of another instance of the given dummy hardware model. Accordingly, a customizable dummy FEM for the dummy hardware model may be provided. The customizable dummy FEM may enable users to adjust the behavior of a dummy FEM corresponding to the dummy hardware model based on their physical dummy hardware so as to quantify its characteristics at a certification level to a proposed vehicle design. The customizable dummy FEM may also allow users to perform robustness simulations on the proposed vehicle design using extremes of certification corridors for the dummy hardware model.

Figure 1:
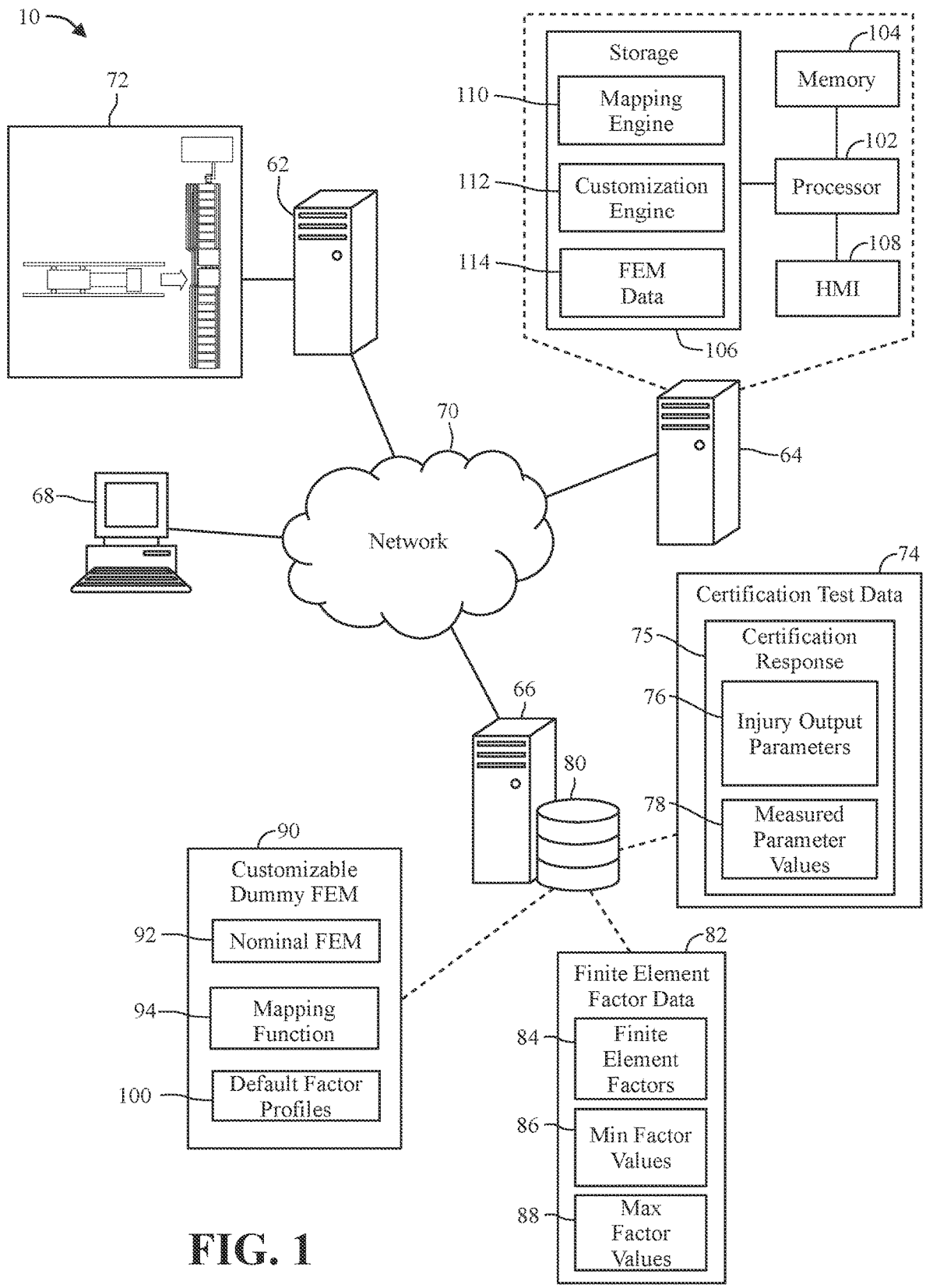
FIG. 1 illustrates a system for generating and customizing customizable dummy finite element models for various crash test dummy hardware models.

FIG. 1 illustrates a system 10 for generating and customizing such customizable dummy FEMs. The system 10 may be configured to generate customizable dummy FEMs for various dummy hardware models, and may be configured to customize the customizable dummy FEMs based on user input that defines target certification responses for the customizable dummy FEMs. In particular, prior to being approved for use in collision testing, a manufactured instance of a given dummy hardware model may be subject to one or more methods of certification testing to determine whether the response of the dummy instance from the certification testing is within certification corridors for the dummy hardware model. The target certification response submitted by a user for a given dummy hardware model may correspond to the response exhibited by the user's instance of the dummy hardware model during certification testing, and may thus function to customize the customizable dummy FEM for the dummy hardware model to the user's physical dummy hardware.

Responsive to receiving user input defining a target certification response for a customizable dummy FEM, the system 10 may be configured to customize the customizable dummy FEM such that if the customizable dummy FEM were to be subjected to simulated certification testing, the customizable dummy FEM would exhibit a response similar to the target certification response. In this way, when the customized dummy FEM is incorporated into an FEM for a proposed vehicle design and subjected to simulated collision testing, the response of the customized dummy FEM may predict how the user's physical dummy hardware will behave in a real-world collision test involving the proposed vehicle design.

Figure 2:
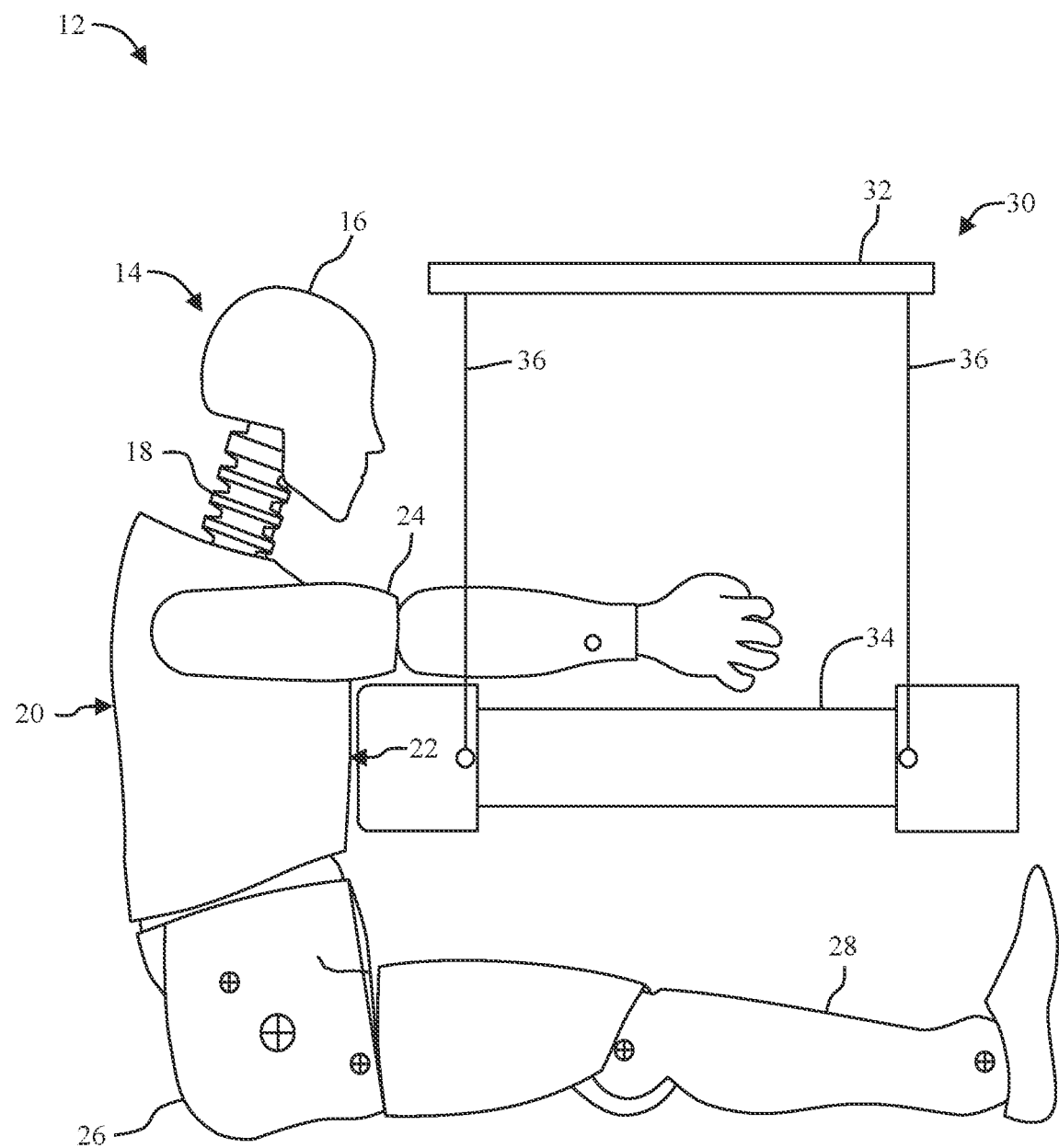
FIG. 2 illustrates a certification testing environment including an occupant type crash test dummy hardware model and a certification testing apparatus for certifying a thorax assembly of the occupant type crash test dummy hardware model.

FIG. 2 illustrates an example of a certification testing environment 12 for certifying instances of an occupant type dummy hardware model 14, which may serve as the basis of a customizable dummy FEM generated by the system 10. The occupant type dummy hardware model 14 may be a fiftieth percentile (50%) male type, and is illustrated in a seated position. The occupant type dummy hardware model 14 may be used primarily to test the performance of automotive interiors and restraint systems for front and rear seat occupants. The size and weight of the occupant type dummy hardware model 14 may be based on anthropometric studies, which are typically done separately by the following organizations: University of Michigan Transportation Research Institute (UMTRI), U.S. Military Anthropometry Survey (ANSUR), and Civilian American and European Surface Anthropometry Resource (CESAR). It will be appreciated that ranges of motions, centers of gravity, and segment masses of the occupant type dummy hardware model 14 may simulate those of human subjects defined by the anthropometric studies.

The occupant type dummy hardware model 14 may include a head assembly 16 and a neck assembly 18 coupled to the head assembly 16. More specifically, the neck assembly 18 may have an upper end mounted to the head assembly 16 and a lower end mounted to a spine assembly that extends into a torso assembly 20 of the occupant type dummy hardware model 14. The torso assembly 20 may include a thorax assembly 22, which may include a rib cage assembly, positioned opposite the spine assembly. The occupant type dummy hardware model 14 may also include a pair of arm assemblies 24, including a right arm assembly and a left arm assembly, connected to the spine assembly of the occupant type dummy hardware model 14. The lower end of the spine assembly may be connected to a lumbar-thoracic adapter, which may be connected to a lumbar to pelvic adapter. The occupant type dummy hardware model 14 may further include a pelvis assembly 26 connected to the lumbar to pelvic adapter, and may include a pair of leg assemblies 28, including a right leg assembly and a left leg assembly, attached to the pelvis assembly 26. Various components of the occupant type dummy hardware model 14 may be covered in a flesh and skin assembly, such as a polyvinyl skin cover, to increase the biofidelity of the occupant type dummy hardware model 14.

The certification testing environment 12 may also include a thorax certification testing apparatus 30 that may be used to test and certify the thorax assembly 22 of each instance of the occupant type dummy hardware model 14. The thorax certification testing apparatus 30 may include a frame 32 and a pendulum 34 pivotally connected to the frame 32, such as by cables 36 extending between the frame 32 and pendulum 34. During certification testing, the pendulum 34 may be pivoted away from the thorax assembly 22 to a starting position, and then released and allowed to pivot towards contact with the thorax assembly 22. Upon contact with the thorax assembly 22, the pendulum 34 may cause a chest deflection in the thorax assembly 22. In one load case, the pendulum 34 may contact the thorax assembly 22 at an impact speed of 3 m/s.

A given dummy hardware model, such as the occupant type dummy hardware model 14, may include load sensors configured to monitor various movements and deformations of the dummy hardware model caused by contact, such as during certification or collision testing. The load sensors may output injury measurement signals predictive of an extent of human injury from the contact. In particular, each injury measurement signal may correspond to an injury output parameter 76 (FIG. 1) specific to the dummy hardware model, which in turn may correspond to a type of movement or deformation of the dummy hardware model that is predictive of human injury. The injury measurement signals output by the load sensors may indicate an extent of each injury output parameter 76 caused by the contact, which in turn may be used to predict an extent of human injury from the contact. The extent of each injury output parameter 76 generated by an instance of a dummy hardware model during certification testing may form a certification response 75 generated by the dummy instance from the certification testing.

For instance, one of the injury output parameters 76 specific to the occupant type dummy hardware model 14 may correspond to a chest deflection of the thorax assembly 22 of the occupant type dummy hardware model 14. Responsive to contact of the pendulum 34 with the thorax assembly 22 of a given instance of the occupant type dummy hardware model 14 during certification testing, the load sensors of the dummy instance may output one or more injury measurement signals indicating an extent of the chest deflection injury output parameter 76 caused by the contact, including the peak chest deflection caused by the contact. The thorax assembly 22 of the dummy instance may be certified for use in collision testing if the extent of the chest deflection injury output parameter 76, or more particularly the peak chest deflection, caused by the pendulum 34 falls within a certification corridor for the chest deflection injury output parameter 76.

Figure 3:
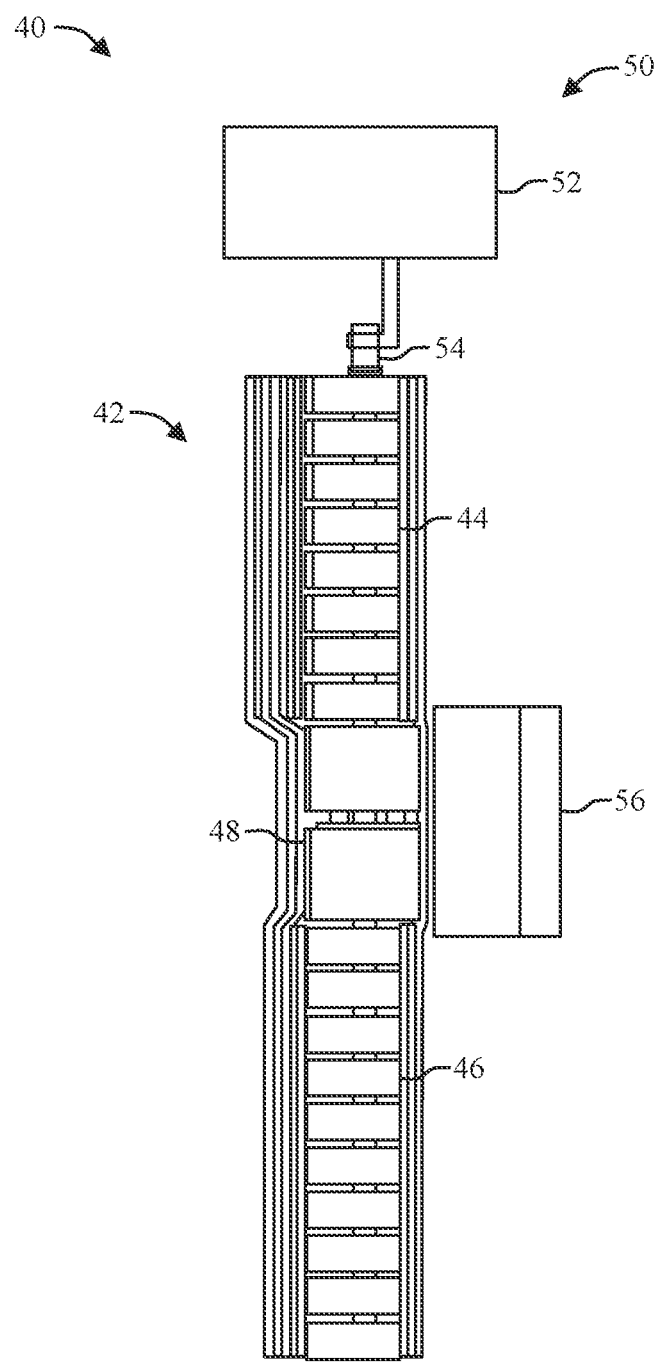
FIG. 3 illustrates a certification testing environment including a pedestrian type crash test dummy hardware model and a certification testing apparatus for certifying the pedestrian type crash test dummy hardware model.

As another example, FIG. 3 illustrates a certification testing environment 40 for certifying instances of a pedestrian type dummy hardware model 42, which may also serve as the basis of a customizable dummy FEM generated by the system 10. The pedestrian type dummy hardware model 42 may be a Flexible Pedestrian Leg-form Impactor (FLEX-PLI) type dummy, which may be used for evaluating injuries to pedestrians in collision testing. The pedestrian type dummy hardware model 42 may include a femur bone assembly 44, a tibia bone assembly 46, and a knee assembly 48. Various components of the pedestrian type dummy hardware model 42 may be covered with a flesh and skin assembly, such as a neoprene skin cover, to increase the biofidelity of the pedestrian type dummy hardware model 42.

The certification testing environment 40 may also include a pedestrian dummy certification testing apparatus 50 that may be used to test and certify instances of the pedestrian type dummy hardware model 42. The pedestrian dummy certification testing apparatus 50 may be an inverse certification testing apparatus including a frame 52 having a hook and release mechanism to which a connection assembly 54 of an instance of the pedestrian type dummy hardware model 42 is attached, and may include a honeycomb block 56 positioned a vertical distance from the frame 52 and initially positioned a horizontal distance from the instance of the pedestrian type dummy hardware model 42. During certification testing, the honeycomb block 56 may be actuated to move towards to make contact with the instance of the pedestrian type dummy hardware model 42, which may correspondingly be released from the hook and release mechanism. Responsive to the honeycomb block 56 contacting the dummy instance, one or more load sensors positioned along the dummy instance may output injury measurement signals indicating the extent of injury output parameters 76 specific to the pedestrian type dummy hardware model 42 caused by the contact. As non-limiting examples, the injury output parameters 76 specific to the pedestrian type dummy hardware model 42 may include a flexion injury output parameter 76 and an elongation injury output parameter 76. A given instance of the pedestrian type dummy hardware model 42 may be certified for use in collision testing if the extents of these injury output parameters 76, or more particularly the peak of these injury output parameters 76, from certification testing falls within certification corridors for these injury output parameters 76.

The above dummy hardware models and certification testing apparatuses are provided as examples. It will be appreciated that the features and methods described herein are not limited to such dummy hardware models and certification testing apparatuses, and can be extended to a variety of dummy hardware models and certification testing apparatuses other than those described above. A given instance of a dummy hardware model may be subject to a variety of different certification testing apparatuses and load cases, and may thus have multiple certification responses 75 associated therewith, each being generated from a different certification testing method (e.g., a different certification testing apparatus or load case).

Referring again to FIG. 1, the system 10 may include a certification testing server 62, a dummy FEM management server 64, a database server 66, and a user computing device 68. Each of these system 10 components may communicate with one another over a communications network 70. The communications network 70 may include one or more private and/or public networks, such as the Internet, a virtual private network, a local area network, a wide area network, and a cellular network. The system 10 components may utilize any suitable or combination of suitable communications technologies and protocols including, but not limited to, wired and wireless connections, always on connections, periodic connections, and on-demand connections.

The user computing device 68 may enable user access to the features of the system 10. For instance, the user computing device 68 may be a laptop, desktop, thin client terminal, mobile device, or tablet. The user computing device 68 may include a web browser and/or one or more applications for connecting with the other components of the system 10.

The certification testing server 62 may be coupled to one or more certification testing environments 72, such as the certification testing environments 12, 40 illustrated in FIGS. 2 and 3. As previously described, the certification testing environments 72 may be configured to test instances of various dummy hardware models to determine whether such dummy instances are certified for use in collision testing.

The certification testing server 62 may be configured to receive the injury measurement signals output by the load sensors of each instance of a dummy hardware model during certification testing, and to generate certification test data 74 for each dummy instance passing certification. The certification test data 74 generated for a given dummy instance from certification testing may indicate the certification response 75 generated by the dummy instance from the certification testing, and may indicate physical attributes (e.g., material stiffness) of the dummy instance.

The certification response 75 generated by a given dummy instance from certification testing may indicate the injury output parameters 76 for the dummy hardware model of the given dummy instance, and may indicate a measured parameter value 78 generated for each injury output parameter 76 by the given dummy instance during certification testing. The measured parameter value 78 for a given injury output parameter 76 may indicate an extent of the injury output parameter 76 from the certification testing. The measured parameter value 78 may be a single value indicating the extent of the injury output parameter 76 from the certification testing (e.g., the peak value of the injury output parameter 76). Alternatively, the measured parameter value 78 may include multiple values indicating the extent of the injury output parameter 76 from the certification testing over time.

The certification testing server 62 may be configured to communicate the certification test data 74 to the database server 66 for storage. As previously mentioned, each instance of a dummy hardware model may be subject to various certification testing methods, such as various certification test apparatuses and various load cases. Accordingly, multiple instances of certification test data 74 may be generated for a given instance of a dummy hardware model, with each instance of the certification test data 74 being stored in association with the certification testing method that resulted in the certification test data 74.

FIG. 4 illustrates a certification response 75A that may be generated and stored for an instance of the pedestrian type dummy hardware model 42 shown in FIG. 3. As shown in the illustrated example, the certification response 75A may indicate several injury output parameters 76 specific to and monitored by the load sensors of the pedestrian type dummy hardware model 42 to predict human injury, such as an upper tibia moment injury output parameter 76A, a mid-upper tibia moment injury output parameter 76B, a mid-lower tibia moment injury output parameter 76C, a lower tibia moment injury output parameter 76D, an anterior cruciate ligament measure injury output parameter 76E, a posterior crucible ligament measure injury output parameter 76F, and a medical collateral ligament measure injury output parameter 76G. The certification response 75A may also indicate a measured parameter value 78 generated for each injury output parameter 76 by the instance of the pedestrian type dummy hardware model 42 during the certification testing.

The database server 66 may be coupled to or include one or more non-volatile memory storage devices storing one or more databases 80, and may be configured to retrieve data from and store data to the one or more databases 80 to facilitate the functionality of the system 10. The one or more databases 80 may contain data corresponding to a variety of matters that enable the system 10 to function as described. For instance, the one or more databases 80 may store the certification test data 74 generated by the certification testing server 62 as described above, finite element factor data 82 for various dummy hardware models, and customizable dummy FEMs 90 for various dummy hardware models.

The finite element factor data 82 for a given dummy hardware model may indicate finite element factors 84 relevant to the injury output parameters 76 for the dummy hardware model. The finite element factors 84 may correspond to configuration parameters or attributes of a dummy FEM for the dummy hardware model that define the response of the dummy FEM to simulated contact. The finite element factors 84 may also correspond to physical attributes of the dummy hardware model (e.g., material stiffness, frictional force between materials). The characteristics of the physical attributes represented by the finite element factors 84 may differ across various instances of the dummy hardware model. To this end, each finite element factor 84 may be associated with a range of values that may be used for the finite element factor 84, with each value representing a different characteristic for the corresponding physical attribute. Different values may thus be used to represent different instances of the dummy hardware model. For example, the frictional force between two adjacent materials of one instance of a dummy hardware model may differ from the frictional force exhibited by these materials in another instance of the dummy hardware model. Accordingly, the value defined for a finite element factor 84 corresponding to this frictional force may differ between the two dummy instances. A given set of finite element factor 84 values corresponding to an instance of a dummy hardware model may be referred to as a finite element factor profile corresponding to the dummy instance.

The finite element factor data 82 for a given dummy hardware model may also indicate the range of values that may be used for each finite element factor 84, such as by indicating a minimum factor value 86 and a maximum factor value 88 for each finite element factor 84. The minimum factor value 86 and maximum factor value 88 for each finite element factor 84 associated with a given dummy hardware model may be determined based on the certification test data 74 stored for the dummy hardware model, as described in more detail below.

FIG. 5 illustrates exemplary finite element factor data 82A that may be generated and stored for the pedestrian type dummy hardware model 42 of FIG. 3. The finite element factor data 82A may indicate several finite element factors 84 determined relevant to the injury output parameters 76 specific to the pedestrian type dummy hardware model 42. The finite element factor data 82A may also indicate a minimum factor value 86 and a maximum factor value 88 for each finite element factor 84.

As shown in the illustrated example, the finite element factors 84 for the pedestrian type dummy hardware model 42 may include, but are not limited to, a finite element factor 84A corresponding to a tibia bone core material property of the pedestrian type dummy hardware model 42, a finite element factor 84B corresponding to an inner/outer knee spring stiffness of the pedestrian type dummy hardware model 42, a finite element factor 84C corresponding to contact friction between neoprene and rubber components of the pedestrian type dummy hardware model 42, a finite element factor 84D corresponding to contact friction between neoprene and hardware components of the pedestrian type dummy hardware model 42, and a finite element factor 84E corresponding to contact friction between a femur block and meniscus of the pedestrian type dummy hardware model 42. Additionally or alternatively, the finite element factors 84 for the pedestrian type dummy hardware model 42 may include a finite element factor 84 corresponding to a femur bone core material property of the pedestrian type dummy hardware model 42, and may include a finite element factor 84 corresponding to contact friction between a knee block and cable of the pedestrian type dummy hardware model 42. Moreover, rather than including a single finite element factor 84B for inner/outer knee spring stiffness, the finite element factors 84 for the pedestrian type dummy hardware model 42 may include a plurality of finite element factors 84 for knee spring stiffness, each corresponding to a precompression length and stiffness of a different knee spring set of the pedestrian type dummy hardware model 42.

Referring again to FIG. 1, the one or more databases 80 may also store customizable dummy FEMs 90 generated by the system 10, or more particularly by the dummy FEM management server 64, for various dummy hardware models. Each customizable dummy FEM 90 may correspond to a dummy hardware model, and may include a nominal dummy FEM 92, a mapping function 94, and default finite element factor profiles 100 for the dummy hardware model.

The nominal dummy FEM 92 may include a mesh made up of several discrete geometrical elements that are arranged to form the dummy hardware model or a region of the dummy hardware model, and configuration parameters that define the behavior of the mesh to simulated contact. The configuration parameters may correspond to the finite element factors 84 for the dummy hardware model. For instance, the configuration parameters may include material cards defining stiffness properties of various materials embodied by the discreet geometrical elements, and friction coefficients defining the interaction between geometric elements of different materials. The nominal dummy FEM 92 may be configured via the configuration parameters to generate a certification response in the middle of the certification corridors for the given dummy hardware model, or more particularity for the injury output parameters 76 specific to the dummy hardware model. In other words, responsive to certification testing for the dummy hardware model being simulated on the nominal dummy FEM 92, the nominal dummy FEM 92 may be configured to generate a certification response in the middle of the certification corridors for the dummy hardware model.

The mapping function 94 may link target injury output parameters 96 (e.g., FIG. 6), which may include one or more or all of the injury output parameters 76 in the certification test data 74 for the dummy hardware model, and the finite element factors 84 for the dummy hardware model at the certification level. More particularly, the mapping function 94 may represent a response surface that models the influence that the finite element factors 84 have on the target injury output parameters 96 relative to certification testing. In other words, the mapping function 94 may indicate the certification response expected to be generated by an instance of the dummy hardware model represented by a given set of finite element factor 84 values, and correspondingly, the certification response expected to be generated by a dummy FEM corresponding to the given set of finite element factor 84 values when the dummy FEM is subject to simulated certification testing. Accordingly, to generate a dummy FEM for the dummy hardware model that is configured with a specified target certification response, the mapping function 94 may be used to determine finite element factor 84 values that minimize the difference between the certification response output by the mapping function 94 and the target certification response.

FIG. 6 illustrates an example of a mapping function 94A that may be generated and stored by the system 10 for the pedestrian type dummy hardware model 42 of FIG. 3. As shown in the illustrated example, the mapping function 94A may include a parameter equation 98 for each target injury output parameter 96 associated with the pedestrian type dummy hardware model 42, with each parameter equation 98 being a polynomial that calculates a parameter value for the associated target injury output parameter 96 as a function of the finite element factors 84 for the pedestrian type dummy hardware model 42. The finite element factors 84 may serve as the variables of each parameter equation 98. Each parameter equation 98 may be determined through a regression method applied to sample data, and may include several unique and constant coefficients multiplied by the finite element factors 84 that represent the influence each individual finite element factor 84 has on the associated target injury output parameter 96 at the certification level, and represent influences various combinations of finite element factors 84 have on the associated target injury output parameter 96 at the certification level.

The mapping function 94 is not limited to polynomial parameter equations 98, such as those shown in FIG. 6. For instance, in alternative examples, the mapping function 94 may indicate a matrix with each element of the matrix being a weight obtained using a radial basis function. In this case, the mapping function 94 may define an equation for each target injury output parameter 96 that equals a weighted sum of the outputs generated by the radial basis function when applied to the finite element factors 84. In other words, the mapping function 94 may define a trained radial basis function for each target injury output parameter 96 that, given a set of finite element factor 84 values, calculates a parameter value for the target injury output parameter 96 that is expected to be generated by a dummy instance corresponding to the set of finite element factor 84 values during certification testing.

The default finite element factor profiles 100 of the customizable dummy FEM 90 for a given dummy hardware model may each include a set of finite element factor 84 values that correspond to an instance of the dummy hardware model with characteristics of special interest, such as certification responses of special interest. For instance, one of the default finite element factor profiles 100 may include finite element factor 84 values corresponding to an instance of the dummy hardware model at an upper extreme of the certification corridors for the dummy hardware model (e.g., a relatively soft instance of the dummy hardware model), and another one of the default finite element factor profiles 100 may include finite element factor 84 values corresponding to an instance of the dummy hardware model at a lower extreme of the certification corridors for the dummy hardware model (e.g., a relatively stiff instance of the dummy hardware model). A further one of the default finite element factor profiles 100 may include finite element factor 84 values corresponding to an instance of the dummy hardware model that represents an average of the instances of the dummy hardware model (e.g., generates a certification response in the middle of the certification corridors for the dummy hardware model or generates a certification response corresponding to an average of the certification responses generated by the instances of the dummy hardware model). Users may select one of the default finite element factor profiles 100 to quickly customize the customizable dummy FEM 90 to the instance of the dummy hardware model to represented by the selected default finite element factor profile 100.

The dummy FEM management server 64 may be configured to generate the customizable dummy FEMs 90 for various dummy hardware models, such as based on the certification test data 74 stored in the one or more databases 80 for the dummy hardware model. More particularly, the dummy FEM management server 64 may be configured to determine the mapping function 94 and the default finite element factor profiles 100 for a given dummy hardware model or a region of the given dummy hardware model, and then store these items as part of the customizable dummy FEM 90 for the dummy hardware model in the one or more databases 80. A customizable dummy FEM 90 generated by the system 10 corresponding to a given dummy hardware model may represent all or a region of the dummy hardware model. The system 10 may thus generate and store multiple customizable dummy FEMs 90 for a same dummy hardware model, each corresponding to a different region of the dummy hardware model.

The dummy FEM management server 64 may also be configured to customize a customizable dummy FEM 90 for a given dummy hardware model based on a user input parameter defining a target certification response for the customizable dummy FEM 90. The target certification response may indicate target parameter values for the target injury output parameters 96 associated with the dummy hardware model to be produced by the customizable dummy FEM 90 at the certification level. In other words, the target certification response may define target parameter values desired to be generated by the customizable dummy FEM 90 when the customizable dummy FEM 90 is subject to simulated certification testing.

Responsive to receiving a target certification response for a given dummy hardware model, the dummy FEM management server 64 may be configured to determine optimized values for the finite element factors 84 associated with the dummy hardware model that minimizes the difference between the target parameter values of the target certification response and the parameter values output by the mapping function 94 for the dummy hardware model. The dummy FEM management server 64 may then be configured to calibrate the nominal dummy FEM 92 for the dummy hardware model based on the optimal finite element factor 84 values so as to provide a dummy FEM customized to the target certification response. Alternatively, the dummy FEM management server 64 may be configured to communicate the optimal finite element factor 84 values to the user computing device 68, which may store the nominal dummy FEM 92 and a script configured to calibrate the nominal dummy FEM 92 for the dummy hardware model based on the optimal finite element factor 84 values so as to provide a dummy FEM customized to the target certification response.

In some instances, a user may also submit a user parameter to the dummy FEM management server 64 that indicates one of the default finite element factor profiles 100 of the customizable dummy FEM 90. As previously described, the default finite element factor profiles 100 may be predetermined to include optimized finite element factor 84 values corresponding to instances of the dummy hardware model of special interest, such as instances that exhibit certification responses of special interest (e.g., certification responses of relatively stiff, soft, or average instances of the dummy hardware model). Responsive to receiving such a user input parameter, the dummy FEM management server 64 may be configured to calibrate the nominal dummy FEM 92 based on the finite element factor 84 values of the selected default finite element factor profile 100 or communicate the finite element factor 84 values of the selected default finite element factor profile 100 to the user computing device 68 as described above.

Each of the certification testing server 62, the dummy FEM management server 64, the database server 66, and the user computing device 68 may include a processor 102, a memory 104, non-volatile storage 106, and a human machine interface (HMI) 108. The processor 102 may include one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog or digital) based on operational instructions stored in the non-volatile storage 106 and read into the memory 104. The memory 104 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or any other device capable of storing information. The non-volatile storage 106 may include one or more persistent data storage devices such as a hard drive, optical drive, tape drive, non-volatile solid state device, and/or any other device capable of persistently storing information.

The processor 102 of each system 10 component may be configured to implement the functionality of the system 10 component described herein. In particular, the processor 102 may operate under control of software embodied by computer-executable instructions residing in the non-volatile storage 106 of the system 10 component. The computer-executable instructions may be compiled or interpreted from a variety of programming languages and/or technologies, including, without limitation, and either alone or in combination, Java, C, C++, C#, Objective C, Fortran, Pascal, Java Script, Python, Perl, Octave, MATLAB, Excel, and PL/SQL. During operation, the processor 102 may be configured to read into the memory 104 of the system 10 component and execute the computer-executable instructions. The computer-executable instructions may be configured, upon execution of the processor 102, to cause the processor 102 to implement the functionality of the system 10 component described herein.

For instance, the computer-executable instructions residing in the non-volatile storage 106 of the dummy FEM management server 64 may embody a mapping engine 110 and customization engine 112, which the processor 102 may be configured to implement upon execution of the computer-executable instructions.

The mapping engine 110 may be configured to determine the mapping function 94 and default finite element factor profiles 100 for a given dummy hardware model, such as based on various analyses of the certification test data 74 corresponding to the dummy hardware model, and to generate a customizable dummy FEM 90 for the dummy hardware model that incorporates the mapping function 94 and default finite element factor profiles 100. The customization engine 112 may be configured to, responsive to receiving a user parameter indicating a target certification response for the customizable dummy FEM 90, determine optimal values for the finite element factors 84 associated with the dummy hardware model that minimizes the difference between the parameter values output by the mapping function 94 of the customizable dummy FEM 90 and the target parameter values defined by the target certification response.

In addition to software programs embodied by computer-executable instructions, the non-volatile storage 106 of each system 10 component may also store FEM data 114 supporting the functionality of the system 10 component. For instance, the FEM data 114 of the non-volatile storage 106 of the database server 66 may store the one or more databases 80. The processor 102 of each system 10 component may be configured to query the FEM data 114 stored in the non-volatile storage 106 of the system 10 component to implement the functionality of the system 10 component described herein.

The HMI 108 of each system 10 component may be operatively coupled to the processor 102 of the system 10 component to allow a user to directly interact with the system 10 component. The HMI 108 may include one or more output devices such as video and alphanumeric displays, a speaker, and any other suitable devices capable of providing data to a user. The HMI 108 may also include one or more input devices and controls such as an alphanumeric keyboard, a pointing device, keypads, pushbuttons, control knobs, microphones, and other devices capable of accepting commands or input from a user and transmitting the entered input to the processor 102.

While an example of a system 10 is described herein, it will be understood that the system 10 may have more or fewer components, and alternative components and/or implementations may be used, to implement the functionality described herein. For instance, two or more of the above-described system 10 components, such as the dummy FEM management server 64 and the database server 66, may be combined and implemented by a single computing system or server. As a further example, the described functionality of one of the system 10 components, such as the dummy FEM management server 64, may be implemented across several computing systems or servers, which may then communicate over one or more direct or indirect connections (e.g., the communications network 70) to implement the described functionality. For instance, the mapping engine 110 and customization engine 112 may be implemented by distinct computing systems or servers that communicate over the communications network 70.

Figure 7:
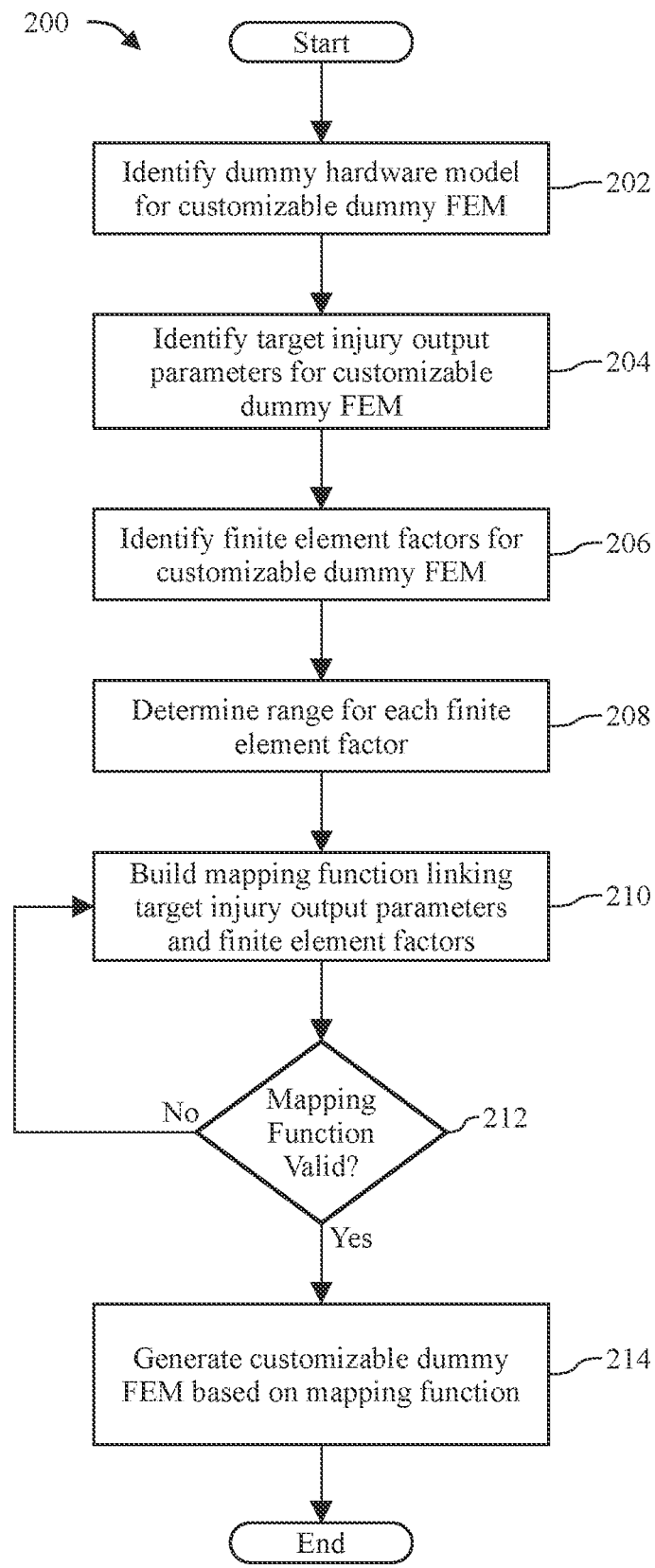
FIG. 7 illustrates a method for generating a customizable dummy finite element model for a given crash test dummy hardware model.

FIG. 7 illustrates a method 200 for creating a customizable dummy FEM 90 for a given dummy hardware model. The method 200 may be implemented by the system 10, or more particularly by the dummy FEM management server 64, such as upon execution of the mapping engine 110.

In block 202, a dummy hardware model for which a customizable dummy FEM 90 is to be developed may be identified. The identified dummy hardware model may be any dummy hardware model used in physical collision testing. For instance, the identified dummy hardware model may be a frontal impact dummy hardware model, side impact dummy hardware model, vulnerable road user dummy hardware model, or child dummy hardware model. As more specific examples, the identified dummy hardware model may be the occupant type dummy hardware model 14 shown in FIG. 2 or the pedestrian type dummy hardware model 42 shown in FIG. 3. A user may submit the identification of the dummy hardware model to the dummy FEM management server 64 via the user computing device 68.

In block 204, target injury output parameters 96 for the customizable dummy FEM 90 may be identified. The target injury output parameters 96 may include one or more or all of the injury output parameters 76 in the certification test data 74 for the dummy hardware model, and may thus similarly correspond to injury measurement signals output by instances of the dummy hardware model during collision and certification testing that are used to evaluate human injury. For instance, assuming the occupant type dummy hardware model 14 illustrated in FIG. 2 has been identified, the target injury output parameters 96 may include a chest deflection injury output parameter, a pelvis load injury output parameter, and a knee elongation injury output parameter. As a further example, assuming the identified dummy hardware model is the pedestrian type dummy hardware model 42 illustrated in FIG. 3, the target injury output parameters 96 may correspond to the injury output parameters 76 listed in FIG. 4.

A certification testing method may also be identified for each target injury output parameter 96 that includes a well-defined certification corridor for the target injury output parameter 96. The target injury output parameters 96 identified for a selected dummy hardware model may be distributed across various regions or components of the dummy hardware model, which may be certified using a variety of different certification testing methods (e.g., pendulum certification test, inverse certification test, varying load cases). Accordingly, a certification testing method may be identified for each target injury output parameter 96 that was used to generate a measured parameter value 78 for the target injury output parameter 96 in a certification response 75. The same certification testing method may be identified for each target injury output parameter 96 included in a same certification response 75.

The mapping function 94 for the dummy hardware model may be generated relative to the certification testing method identified for each target injury output parameter 96. In other words, the mapping function 94 may indicate a parameter value for each target injury output parameter 96 that corresponds to the certification testing method identified for the target injury output parameter 96. To the extent measured parameter values 78, simulated certification testing, and previous experience is used to generate the mapping function 94 for a target injury output parameter 96, these items may correspond to the certification testing method identified for the target injury output parameter 96.

In some instances, rather than building a customizable dummy FEM 90 representative of the entirety of the identified dummy hardware model, a user may select a subset (e.g., one or more) regions or components of the identified dummy hardware model for development of a customizable dummy FEM 90 for the dummy hardware model. In this case, the identified target injury output parameters 96 may be specific to those of the identified regions or components, and separate customizable dummy FEMs 90 may be generated for various regions or components of the dummy hardware model.

A user may identify the target injury output parameters 96 and certification testing methods to the dummy FEM management server 64 via the user computing device 68. Alternatively, a user may identify the target injury output parameters 96, and the dummy FEM management server 64 may be configured to query the certification test data 74 to determine a certification testing method for each target injury output parameter 96.

In block 206, finite element factors 84 that are relevant to the selected dummy hardware model, or more particularly to the identified target injury output parameters 96, may be identified. Specifically, a target characteristic may be identified for each target injury output parameter 96. As examples, the target characteristic for a given target injury output parameter 96 may be a peak value generated for the target injury output parameter 96 during certification testing, values generated for the target injury output parameter 96 at two or more particular times during certification testing, or an entire curve generated for the target injury output parameter 96 during certification testing. Thereafter, an extensive study of the certification test data 74 for the dummy hardware model relative to the identified target characteristics may be conducted, such as using a principal component analysis, and trends among the target injury output parameters 96 relative to various physical attributes of the dummy hardware model may be identified. Proposed sources of variability, such as manufacturing sources, testing sources, and calibration sources, may be determined. Equivalents of these sources may then be identified in a dummy FEM for the dummy hardware model, which may serve as the finite element factors 84 determined for the dummy hardware model. A user may indicate these finite element factors 84 to the dummy FEM management server 64 via the user computing device 68.

Thus, following block 206, 'n' finite element factors 84 for the dummy hardware model may have been identified, each of which may be denoted as 'X' (e.g., X1, X2, X3, . . . Xn), and 'm' target injury output parameters 96 for the dummy hardware model may also have been identified, each of which may be denoted as 'Y' (e.g., Y1, Y2, Y3, . . . Ym).

Thereafter, in block 208, a realistic variation range may be identified for each finite element factor 84. More particularly, a minimum factor value 86 and a maximum factor value 88 may be determined for each finite element factor 84. The minimum and maximum factor values 86, 88 for each finite element factor 84 may be determined based on experience with both the dummy hardware model and dummy FEMs specific to the dummy hardware model. For instance, the measured parameter values 78 of the certification test data 74 for the dummy hardware model may be used in connection with the information about the physical attributes of the dummy instances from which the certification test data 74 was generated to heuristically identify a range for each finite element factor 84. Such ranges may be uploaded to the dummy FEM management server 64 via the user computing device 68, and the dummy FEM management server 64 may be configured to responsively store the finite element factors 84 and ranges for a given dummy hardware model as finite element factor data 82 for the dummy hardware model in the one or more databases 80, as described above.

In block 210, a mapping function 94 for the dummy hardware model may be determined. As previously described, the mapping function 94 may indicate the relationships between the identified finite element factors 84 and the target injury output parameters 96, such as at the certification level. More particularity, the mapping function 94 may represent a multi-dimensional response surface that indicates values of the target injury output parameters 96 at the certification level as a function of the finite element factors 84. In one example, as illustrated in FIG. 6, the mapping function 94 may indicate a parameter equation 98 for each target injury output parameter 96 that defines the target injury output parameter 96 as a function of each finite element factor 84. In other words, the total number of parameter equations 98 may equal the total number of target injury output parameters 96 for the dummy hardware model. Each parameter equation 98 may calculate an expected certification parameter value for its associated target injury output parameter 96 as a function of the finite element factors 84 for the dummy hardware model. The mapping function 94 may thus establish a link between the certification response of the customizable dummy FEM 90 for the dummy hardware model and the finite element factors 84.

The dummy FEM management server 64 may be configured to determine the mapping function 94 by identifying finite element factor profiles for the dummy hardware model that represent instances of the dummy hardware model having certification responses within the certification corridors for the dummy hardware model, and defining a mapping function 94 based on the identified finite element factor profiles that allows other finite element factor profiles for the dummy hardware model to be interpolated from the identified finite element factor profiles.

To this end, the dummy FEM management server 64 may be configured to apply a Design of Experiments ("DOE") methodology to the target injury output parameters 96 and the finite element factors 84. The DOE can be multi-level depending upon the number of identified finite element factors 84 and the level of non-linearity expected in the customizable dummy FEM 90. The applied DOE methodology may include, without limitation, full factorial, fractional factorial, Latin hypercube, central composite, or a combination of these methodologies. The DOE may be studied to obtain an understanding of the relationships between the various target injury output parameters 96 and finite element factors 84, such as using pareto charts, parallel co-ordinates, scatter diagrams, co-relation coefficients, linear and interaction effects, or a combination thereof. The goal of the DOE is to define a mapping function 94 that covers the whole certification corridor for each target injury output parameter 96 in all certification tests while also ensuring that other injury output parameters 76 and/or injury measurement signals not targeted also stay within their certification corridors to ensure validity of the model.

Based on the DOE analysis, a suitable mapping function 94 may be identified that forms a mathematical model connecting the finite element factors 84 and the target injury output parameters 96. The mapping function 94 may include a variable for each finite element factor 84, and may also include one or more additional variables each representing a combination of two or more of the finite element factors 84. Depending upon the number of target injury output parameters 96 and the number of runs of the DOE, interpolation or generalization methods like regression, radial basis function, kriging, neural network, support vector machine, gaussian processes, or a combination thereof may be used to form the mapping function 94.

To set up the DOE, finite element factor profiles corresponding to the certification corridors for the target injury output parameters 96, such as the extremes of such certification corridors, may be identified. Each finite element factor profile may include values for the finite element factors 84 that, when compiled into a dummy FEM for the dummy hardware model, produces a response at the certification level within the certification corridors for the dummy hardware model. In other words, each identified finite element factor profile may be configured to produce a dummy FEM for the dummy hardware model that, when subjected to simulated certification testing corresponding to one of the target injury output parameters 96, produces a certification parameter value for the target injury output parameter 96 that is within the certification corridor for the target injury output parameter 96. For instance, referring to the occupant type dummy hardware model 14 of FIG. 2, the identified finite element factor profiles may each compile into a dummy FEM for the occupant type dummy hardware model 14 that, when subjected to simulated certification testing, exhibit a peak chest deflection within the certification corridor for the chest deflection injury output parameter 76 for the occupant type dummy hardware model 14. The combination of finite element factor 84 values set forth in each identified finite element factor profile may differ from the combination of finite element factor 84 values set forth in the other identified finite element factors profiles.

In addition to finite element factor 84 values, each identified finite element factor profile may also set forth the certification response expected to be exhibited by a dummy FEM corresponding to the finite element factor 84 values of the finite element factor profile. As an example, for each identified finite element factor profile, the dummy FEM management server 64 may be configured to plug the finite element factor 84 values of the finite element factor profile into the nominal dummy FEM 92 for the dummy hardware model, and to simulate the certification testing methods identified for the target injury output parameters 96 against the dummy FEM and observe the parameter value generated by the dummy FEM for each target injury output parameter 96. The dummy FEM management server 64 may then be configured to record the certification response of the dummy FEM from the simulated certification testing in the finite element factor profile. Alternatively, if a given finite element factor profile represents an instance of the dummy hardware model for which certification test data 74 has been generated, the dummy FEM management server 64 may be configured to retrieve and store the measured parameter values 78 for the dummy instance in the finite element factor profile.

The dummy FEM management server 64 may be configured to incorporate the identified finite element factor profiles into a DOE matrix for further analysis. Each column of the DOE matrix may correspond to a different finite element factor 84 or a different target injury output parameter 96, and each row of the DOE matrix, also referred to as a "run," may set forth a different one of the identified finite element factor profiles.

In some examples, the dummy FEM management server 64 may be configured to identify the finite element factor profiles using a full factorial DOE methodology. As previously described, each finite element factor 84 identified for the dummy hardware model may be associated with a minimum factor value 86 and a maximum factor value 88 for the finite element factor 84. In some instances, the dummy FEM management server 64 may be configured to generate a finite element factor profile for each possible combination of the minimum factor values 86 and the maximum factor values 88 defined for the finite element factors 84. In other words, each identified finite element factor profile may set forth a value for each finite element factor 84 that is either the minimum factor value 86 or the maximum factor value 88 for the finite element factor 84. Thus, the value for each finite element factor 84 in one of the identified finite element factor profiles may be the minimum factor value 86 defined for the finite element factor 84, and the value for each finite element factor 84 in another one of the identified finite element factor profiles may be the maximum factor value 88 defined for the finite element factor 84. The values for the finite element factors 84 of the other identified finite element factor profiles may include at least one minimum factor value 86 and at least one maximum factor value 88 defined for the finite element factors 84.

Figure 8:
FIG. 8 illustrates a design of experiments ("DOE") matrix that may be generated to determine a mapping function for a customizable dummy finite element model.

FIG. 8 illustrates a DOE matrix 222 that may be generated by the dummy FEM management server 64 with finite element factor profiles identified according to the above design. Each row of the DOE matrix 222 may correspond to a different finite element factor profile. In the example illustrated in FIG. 8, each finite element factor 84 of the DOE matrix 222 is assigned one of two values, namely, the minimum factor value 86 for the finite element factor 84 (coded as "−1") and the maximum factor value 88 for the finite element factor 84 (coded as "1"). Correspondingly, the values for the finite element factors 84 of one of the listed finite element factor profiles may be the minimum factor values 86 defined for the finite element factors 84, the values for the finite element factors 84 of another one of the listed finite element factor profiles may be the maximum factor values 88 defined for the finite element factors 84, and the values for the finite element factors 84 of the other listed finite element factor profiles may include at least one of the minimum factor values 86 and at least one of the maximum factor values 88 defined for the finite element factors 84.

The total number of finite element factors 84 and number of values for each finite element factor 84 (e.g., minimum of two) within the identified finite element factor profiles may determine the size of the DOE matrix, and can be adjusted (e.g., increased or reduced) based on the specific customizable dummy FEM development application. Different customizable dummy FEM applications may use different numbers and types of finite element factors 84, and may thus generate DOE matrices of different sizes.

For instance, in addition to the minimum factor value 86 and the maximum factor value 88, each finite element factor 84 may take other values within the DOE matrix. As an example, each finite element factor 84 may also take intermediate levels between the minimum factor value 86 and the maximum factor value 88 for the finite element factor 84, such as 30% and 60% of the range between the minimum factor value 86 and the maximum factor value 88. In other words, the dummy FEM management server 64 may be configured to identify a finite element factor profile for each possible combination of values for the finite element factors 84, with the value for each finite element factor 84 being the minimum factor value 86 for the finite element factor 84, the maximum factor value 88 for the finite element factor 84, or an intermediary level therebetween.

In some examples, the dummy FEM management server 64 may be configured to identify a predetermined number (e.g. 600) of finite element factor profiles using a combination of DOE methodologies. For example, the dummy FEM management server 64 may be configured to generate finite element factor profiles using one of the full factorial designs described above, a center composites methodology, a Latin hypercube methodology, and manual generation. If the total number of finite element factor profiles generated from these methodologies exceeds the predetermined number, then the dummy FEM management server 64 may be configured to randomly select the predetermined number of finite element factor profiles from the group, and then utilize the selected finite element factor profiles for the DOE matrix. Alternatively, the dummy FEM management server 64 may be configured to allocate a certain number of finite element factor profiles to each methodology such that the allocated numbers equal the predetermined number.

As previously mentioned, each finite element factor profile listed in the DOE matrix may also include the certification response corresponding to the finite element factor 84 values of the finite element factor profile. In other words, the DOE matrix may include a column for each target injury output parameter 96 for receiving the certification parameter value expected to be generated for the target injury output parameter 96 by a dummy FEM corresponding to the finite element factor 84 values of the finite element factor profile. The certification response for a given finite element factor profile may be determined based on standard physics and experience, certification test data 74 generated by an instance of the dummy hardware model corresponding to the finite element factor 84 values of the finite element factor profile, and/or by plugging the finite element factor 84 values into the nominal dummy FEM 92 for the dummy hardware model and observing a response of this dummy FEM when subject to simulated certification testing as described above.

Responsive to generating the DOE matrix, the dummy FEM management server 64 may be configured to generate the mapping function 94 for the dummy hardware model. To this end, the dummy FEM management server 64 may be configured to randomly split the finite element factor profiles of the DOE matrix into three groups for training, testing, and cross-validation, respectively. For instance, the dummy FEM management server 64 may be configured to randomly select 80% of the finite element factor profiles for training, 10% of the finite element factor profiles for cross-validation, and 10% of the finite element factor profiles for testing. Thus, assuming the DOE matrix is made up of 600 finite element factor profiles, 480 of the finite element factor profiles may be randomly selected for the training group, 60 of the finite element factor profiles may be randomly selected for the testing group, and 60 of the finite element factor profiles may be randomly selected for the cross-validation group.

The dummy FEM management server 64 may then be configured to analyze the training group to understand the relationship between the target injury output parameters 96 and the finite element factors 84, such as using pareto charts, parallel co-ordinates, scatter diagrams, co-relation coefficients, linear and interaction effects, or a combination thereof. The dummy FEM management server 64 may then generate an initial mapping function 94 based on the analysis of the training group, such as using interpolation or generalization methods like regression, radial basis function, kriging, neural network, support vector machine, gaussian processes, or a combination thereof.

Following generation of the initial mapping function 94 based on the DOE analysis, the dummy FEM management server 64 may be configured to tune or optimize the initial mapping function 94 using the finite element factor profiles of the cross-validation group. More particularly, one or more evaluation metrics may be identified to test the validity and precision of the mapping function 94. Examples of such validation metrics may include maximum error, standard deviation, regression coefficient, mean squared error, and F-score.

Thereafter, the dummy FEM management server 64 may be configured to randomly split the finite element factor profiles of the cross-validation group into multiple subgroups or "folds," and perform several optimization runs on the initial mapping function 94 based on the folds such that in each optimization run, a different fold is held back as test data while the remaining folds are used to optimize the mapping function 94, such as using a stochastic optimization method (e.g., non-sorted genetic algorithm, basin hopping, brute force), a deterministic optimization method (e.g., sequential quadratic programming, Newton's method), or a combination thereof. For instance, the dummy FEM management server 64 may be configured to initially apply a stochastic optimization method to determine initial optimized parameters for the mapping function 94, and thereafter apply a deterministic optimization method starting with the initial optimized parameters to determine final optimized parameters for the mapping function 94. During this optimization process, certain constraints may be followed, such as bounds on the target injury output parameters 96 and on the injury output parameters 76 for the dummy hardware model that are not included in the target injury output parameters 96, which may be defined by the certification corridors for the respective injury output parameters.

Following each optimization run, the fold held back as test data may be applied to the optimized mapping function 94 to determine one or more of the validation metrics discussed above relative to the test data. The mapping function 94 of the optimization run having the best validation metrics may be retained while the other optimization runs may be discarded. This process of randomly grouping the finite element factor profiles of the cross-validation group into folds and performing multiple optimization runs may be repeated until the mapping function 94 resulting from an optimization run satisfies target values for the validation metrics (e.g., each determined validation metric is less than a target value for the validation metric).

In block 212, a determination may be made of whether the optimized mapping function 94 satisfies the target values for the identified validation metrics relative to the finite element factor profiles of the testing group. In particular, the dummy FEM management server 64 may be configured to plug the finite element factor 84 values of each finite element factor profile of the testing group into the mapping function 94 and determine the validation metrics for the certification response generated by the mapping function 94 relative to the expected certification response of the finite element factor profile. Responsive to a determined validation metric failing to satisfy the target value for the validation metric, the dummy FEM management server 64 may be configured to determine that the mapping function 94 is invalid. Alternatively, the dummy FEM management server 64 may be configured to determine that the mapping function 94 is invalid responsive to the validation metrics determined for a predetermined percentage of the finite element factor profiles of the testing group failing to satisfy the target values for the validation metrics, and/or responsive to an average of a validation metric determined for the finite element factor profiles failing to satisfy the target value for the validation metric. Otherwise, the dummy FEM management server 64 may be configured to determine that the mapping function 94 is valid.

Responsive to determining that the mapping function 94 is invalid ("No" branch of block 212), the method 200 may return to block 210 to perform another round of tuning the mapping function 94 using the finite element factor profiles of the cross-validation group as described above, and thereafter repeating the validation determination of block 212. Alternatively, responsive to determining that the mapping function 94 is valid ("Yes" branch of block 212), in block 214, a customizable dummy FEM 90 for the dummy hardware may be generated, such as by the dummy FEM management server 64. In particular, the dummy FEM management server 64 may be configured to store the validated mapping function 94 for the dummy hardware model in association with the nominal dummy FEM 92 for the dummy hardware model and the identified target injury output parameters 96 in the one or more databases 80. These associated data items may collectively form the customizable dummy FEM 90 for the dummy hardware model stored in the one or more databases 80. The customizable dummy FEM 90 may also include the finite element factor data 82 generated for the dummy hardware model.

In some implementations, default finite element factor profiles 100 for the customizable dummy FEM 90 may also be determined. As previously described, the default finite element factor profiles 100 may be predetermined to include finite element factor 84 values that correspond to instances of the dummy hardware model that are of special interest. For instance, one default finite element factor profile 100 may correspond to an instance of the dummy hardware model at the upper extremes of the certification corridors for the target injury output parameters 96, and another one of the default finite element factor profiles 100 may correspond to instances of the dummy hardware model that are at lower extremes of the certification corridors for the target injury output parameters 96. A further one of the default finite element factor profiles 100 may correspond to an average instance of the dummy hardware model (e.g., an instance that generates an average of the measured parameter values 78 for the target injury output parameters 96 for the dummy hardware model).

The dummy FEM management server 64 may be configured to determine the default finite element factor profiles 100 for the customizable dummy FEM 90 by being configured to first determine default target certification responses for the instances of the dummy hardware model that are of special interest. Such default target certification responses may each include a different set of target parameter values for the target injury output parameters 96.

As an example, for a default finite element factor profile 100 corresponding to an average instance of the dummy hardware model relative to the target injury output parameters 96, the dummy FEM management server 64 may be configured to determine a default target certification response for the default finite element factor profile 100 by identifying an average of the measured parameter values 78 for each target injury output parameter 96 in the certification test data 74 for the dummy hardware model, and using such averages as the target parameter values for the target injury output parameters 96.

Relative to a default finite element factor profile 100 corresponding to an instance of the dummy hardware model at an upper extreme of the certification corridors for the target injury output parameters 96, the dummy FEM management server 64 may be configured to determine the default target certification response for the default finite element factor profile 100 by determining the measured parameter values 78 generated for the target injury output parameters 96 by an instance of the dummy hardware model that are closest to the upper extremes of the certification corridors for the target injury output parameters 96, and using such measured parameter values 78 as the target parameter values. Alternatively, the dummy FEM management server 64 may be configured to determine the default target certification response for the default finite element factor profile 100 by determining an average of a number of measured parameter values 78 generated for each target injury output parameter 96 by instances of the dummy hardware model that are closest to the upper extreme of the certification corridor for the target injury output parameter 96, and using such average as the target parameter value for the target injury output parameter 96.

Similarly, relative to a default finite element factor profile 100 corresponding to an instance of the dummy hardware model at a lower extreme of the certification corridors for the target injury output parameters 96, the dummy FEM management server 64 may be configured to determine the default target certification response for the default finite element factor profile 100 by determining the measured parameter values 78 generated for the target injury output parameters 96 by an instance of the dummy hardware model that are closest to the lower extremes of the certification corridors for the target injury output parameters 96, and using such measured parameter values 78 as the target parameter values. Alternatively, the dummy FEM management server 64 may be configured to determine the default target certification response for the default finite element factor profile 100 by determining an average of a number of measured parameter values 78 generated for each target injury output parameter 96 by instances of the dummy hardware model that are closest to the lower extreme of the certification corridor for the target injury output parameter 96, and using such average as the target parameter value for the target injury output parameter 96.

Responsive to determining a default target certification response for a given default finite element factor profile 100, the dummy FEM management server 64 may be configured to determine optimized finite element factor 84 values for the default finite element factor profile 100 that correspond to the default target certification response. More particularly, the dummy FEM management server 64 may be configured to determine finite element factor 84 values such that the error between the certification response generated by the mapping function 94 and the default target certification response is minimized. In other words, the dummy FEM management server 64 may be configured to determine optimized values for the finite element factors 84 such that the error between the parameter values generated by the mapping function 94 and the target parameter values of the default target certification response is minimized.

If the default target certification response corresponds to the certification response of one of the finite element factor profiles identified in block 206, then the dummy FEM management server 64 may be configured to set the optimized finite element factor 84 values of the default finite element factor profile 100 to the finite element factor 84 values of the corresponding finite element factor profile. Alternatively, if the default target certification response does not correspond to the certification response of one of the identified finite element factor profiles, then the dummy FEM management server 64 may be configured to determine optimized finite element factor 84 values for the default finite element factor profile that minimizes one or more of the above validation metrics, such as the sum of squared differences, relative to the default target certification response and the certification response output by the mapping function 94. In other words, the dummy FEM management server 64 may be configured to determine optimized finite element factor 84 values that minimize Total Error in the following equation:

$$\text{Total Error} = \sum_{i=1}^{m}(Y_{cal\_i} - Y_{test\_i})^2 \qquad (1)$$

where $Y_{cal\_i}$ is the parameter value output for the $i^{th}$ target injury output parameter 96 by the mapping function 94 for a given set of finite element factor 84 values and $Y_{test\_i}$ is the target parameter value for the $i^{th}$ target injury output parameter 96 in the default target certification response.

The dummy FEM management server 64 may be configured to determine the optimized finite element factor 84 values that minimize Equation (1) and/or one or more other validation metrics by using a stochastic optimization method (e.g., non-sorted genetic algorithm, basin hopping, brute force), a deterministic optimization method (e.g., sequential quadratic programming, Newton's method), or by using a combination thereof. For instance, the dummy FEM management server 64 may be configured to initially apply a stochastic optimization method to determine initial optimized finite element factor 84 values, and thereafter apply a deterministic optimization method starting with the initial optimized finite element factor 84 values to determine final optimized finite element factor 84 values. During this optimization process, the values plugged into the finite element factors 84 may be bound by the minimum factor values 86 and maximum factor values 88 determined for the finite element factors 84.

Figure 9:
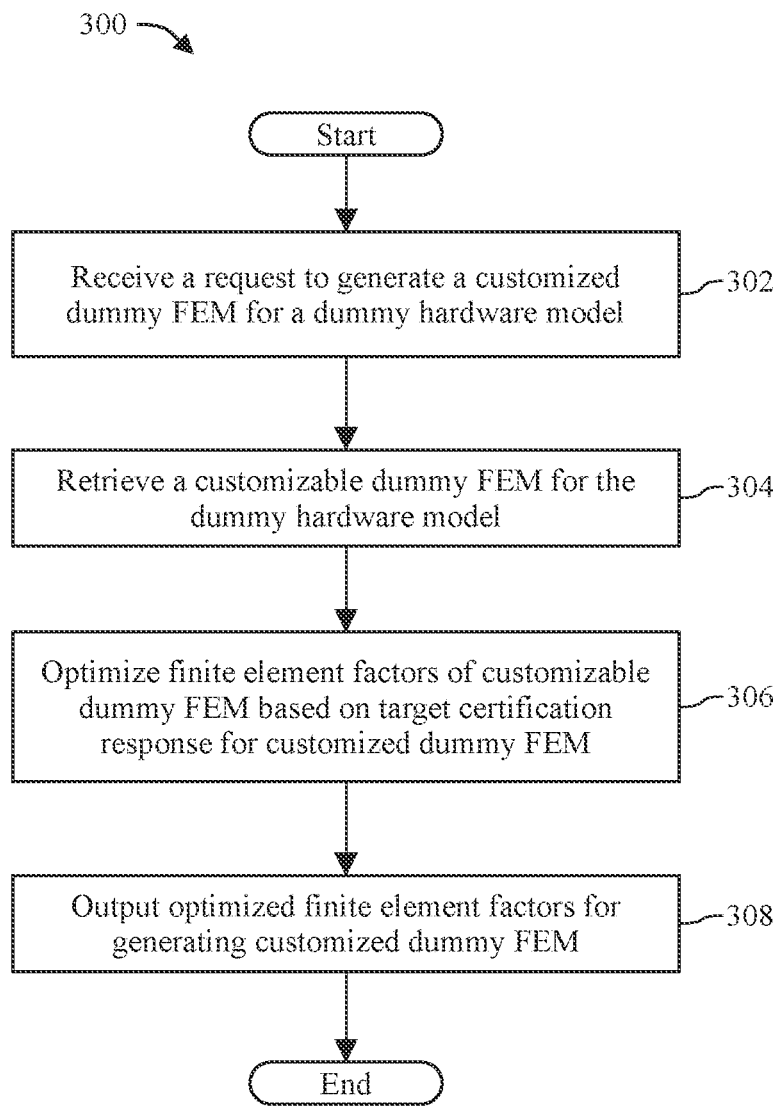
FIG. 9 illustrates a method for customizing a customizable dummy finite element model corresponding to a given crash test dummy hardware model.

FIG. 9 illustrates a method 300 for generating a customized dummy FEM for a given dummy hardware model from a customizable dummy FEM 90 for the dummy hardware model. The method 300 may be implemented by the system 10, or more particularly by the dummy FEM management server 64, such as upon execution of the customization engine 112.

In block 302, a request to generate a customized dummy FEM for a dummy hardware model may be received, such as by the dummy FEM management server 64. For instance, a user may interact with the user computing device 68 to communicate the request to the dummy FEM management server 64 over the communications network 70. In block 304, responsive to receiving the request, the customizable dummy FEM 90, or more particularly the mapping function 94, corresponding to the request may be retrieved, such as from the one or more databases 80.

The request to generate the customized dummy FEM for the dummy hardware model may include a user input parameter defining a target certification response for the customized dummy FEM. The target certification response may indicate a desired response of the customized dummy FEM at the certification level, such as by indicating target parameter values for the target injury output parameters 96 associated with the hardware dummy model that are desired to be generated by the customized dummy FEM at the certification level (i.e., responsive to simulated certification testing). As an example, the target certification response may correspond to a certification response generated by the user's physical dummy hardware so as to request the customizable dummy FEM 90 for the dummy hardware model to be customized to the user's physical dummy hardware. As a further example, the target certification response may correspond to an instance of the dummy hardware model with a certification response at an extreme of the certification corridors for the dummy hardware model, or to an instance of the dummy hardware model with an average certification response, which may enable a user to perform robust simulated collision studies on a proposed vehicle design using dummy FEMs corresponding to the stiffest, softest, and average instances of the dummy hardware model passing certification.

In some examples, the user input parameter may indicate an identifier corresponding to a certification response 75 stored in the one or more databases 80. For instance, the identifier may correspond to a certification response 75 generated by the user's physical dummy hardware, to a certification response 75 generated for a relatively stiff instance of the dummy hardware model, to a certification response 75 generated for a relatively soft instance of the dummy hardware model, or to a certification response 75 generated for a relatively average instance of the dummy hardware model. Responsive to receiving the identifier, the dummy FEM management server 64 may be configured to retrieve the certification response 75 associated with the identifier from the one or more databases 80, and to use the retrieved certification response 75 as the target certification response.

Additionally or alternatively, the dummy FEM management server 64 may be configured to cause the user computing device 68 to display an optimization screen that enables a user to manually define the target parameter values of the target certification response. For instance, the optimization screen may include fields for receiving a target parameter value for each target injury output parameter 96 associated with the customizable dummy FEM 90 at a certification level, with such target parameter values defining the target certification response of the user input parameter. FIG. 10 illustrates a user interactive optimization window 320 that may be displayed on the user computing device 68 for this purpose.

In block 306, the finite element factors 84 for customizable dummy FEM 90 may be optimized based on the retrieved mapping function 94 and the target certification response, such as by the dummy FEM management server 64. More particularly, the dummy FEM management server 64 may be configured to determine an optimal finite element factor profile that includes values for the finite element factors 84 (X1, X2, X3, . . . Xn) of the mapping function 94 for the customizable dummy FEM 90 that satisfy one or more of the validation metrics described above. In other words, the finite element factor 84 values of the optimal finite element factor profile may be selected so as to minimize the error between the parameter values output by the mapping function 94 and the target parameter values of the target certification response. To this end, the dummy FEM management server 64 may be configured to implement a stochastic optimization algorithm (e.g., non-sorted genetic algorithm, basin hopping, brute force), a deterministic optimization algorithm (e.g., sequential quadratic programming, Newton's method), or a combination thereof to determine finite element factor 84 values that satisfy target values for the one or more validation metrics. For instance, the dummy FEM management server 64 may be configured to first apply multi-objective stochastic solvers to the mapping function 94 based on the target certification response and identified model constraints (e.g., finite element factor 84 constraints, constraints on the target injury output parameters 96 and other injury output parameters 76 not specified in the target certification response), such as to determine the pareto frontiers, and to then apply single objective determined solvers to the results of the stochastic solvers to determine the optimal finite element factor 84 values.

In block 308, the optimal finite element factor profile may be output for integration into the nominal dummy FEM 92 for the dummy hardware model to generate the requested custom dummy FEM. More particularly, the dummy FEM management server 64 may be configured to communicate the optimal finite element factor profile to the user computing device 68 for display. FIG. 11 illustrates a user interactive window 330 that may be displayed on the user computing device 68 showing the finite element factor 84 values of the optimal finite element factor profile. The user computing device 68 may store the nominal dummy FEM 92 corresponding to the customizable dummy FEM 90 and a script that is configured, such as upon user interaction with a calibrate element 332 of the user interactive window 330, to calibrate the configuration parameters of the nominal dummy FEM 92, such as the material cards and friction coefficients, to correspond to the optimal finite element factor 84 values. The user interactive window 330 may also include a user interactive copy element 334 that enables a user to store the optimal finite element factor 84 values for later use.

Thereafter, the user computing device 68 may render a customized dummy FEM tailored to the target certification response. In other words, responsive to the customized dummy FEM being subjected to simulated contact, the customized dummy FEM may behave like a physical instance of the dummy hardware model that produces the target certification response at the certification level.

As previously described, the user parameter of the request submitted in block 302 may also indicate one of the default finite element factor profiles 100 predetermined for the customizable dummy FEM 90. Responsive to receiving such a user input parameter, the dummy FEM management server 64 may be configured to output the default finite element factor profile 100 to the user computing device 68, which may then be integrated into the nominal dummy FEM 92 as described above.

In the examples described above, the dummy FEM management server 64 may be configured to determine the optimal finite element factor profile based on the request received by the user. In alternative examples, the user computing device 68 may be configured to determine the optimal finite element factor profile using the methodologies described above. In particular, in addition to the nominal dummy FEM 92 for the dummy hardware model and the script described above, the mapping function 94 and default finite element factor profiles 100 for the dummy hardware model, and the customization engine 112, may also be distributed to and installed on the user computing device 68. For instance, these items may be distributed to the user computing device 68 as a single executable package, and the user computing device 68, such as via execution of the customization engine 112, may be configured to generate the optimal finite element factor profile and integrate this profile into the nominal dummy FEM 92 as described above. In still other examples, rather than the user computing device 68 being configured to generate the customized dummy FEM from the optimal finite element factor profile, the dummy FEM management server 64 may be configured to generate and communicate the customized dummy FEM to the user computing device 68 for simulated collision testing, such as via the one or more communication networks 70.

As described above, multiple customizable dummy FEMs 90 may be generated for a given dummy hardware model, each specific to a distinct region or a distinct one or more injury output parameters 76 for the dummy hardware model. In this case, the injury output parameters 76 for the dummy hardware model may be spread across different customizable dummy FEMs 90. Referring to FIG. 4, for example, the injury output parameters 74 T1-T4 may serve as the target injury output parameters 96 of one customizable dummy FEM 90 generated for the pedestrian type dummy hardware model 42 illustrated in FIG. 3, and the ACL, PCL, and MCL injury output parameters 76 may serve as the target injury output parameters 96 of another customizable dummy FEM 90 generated for the pedestrian type dummy hardware model 42 illustrated in FIG. 3.

In some instances, such as when multiple customizable dummy FEMs 90 are generated for a given dummy hardware model, a user may desire to generate a customized dummy FEM that includes two or more customizable dummy FEMs 90 interacting with one another. In this case, the request for a customized dummy FEM received in block 302 may indicate a target certification response for each customizable dummy FEM 90. Responsive to receiving such a request, the dummy FEM management server 64 may be configured to retrieve the mapping function 94 of each implicated customizable dummy FEM 90, and to optimize the finite element factors 84 for the implicated customizable dummy FEMs 90 together using the retrieved mapping functions 94. For example, the dummy FEM management server 64 may be configured to group target injury output parameters 96 of the customizable dummy FEMs 90 that depend on one or more same finite element factors 84 according to the retrieved mapping functions 94, and to optimize the finite element factors 84 for these target injury output parameters 96 as a group.

As described above, various certification testing methods may be used to certify various components of a dummy hardware model, and different testing methods may be used to certify a same component of a dummy hardware model. For instance, a given component of a dummy hardware model may be tested using varying certification testing apparatuses and/or varying load cases. Referring to the certification testing environment 12 of FIG. 2, for example, the pendulum 34 may be applied to the thorax assembly 22 of the occupant type dummy hardware model 14 at different speeds, thus representing different load cases. Different testing methods applied to a same instance of a given dummy hardware model during certification testing may generate different measured parameter values 78 for the injury output parameters 76 specific to the dummy hardware model. The different testing methods may thus generate different certification responses 75 for the dummy instance, and may thus include different certification corridors for the injury output parameters 76 for the dummy hardware model.

In some examples, the system 10, or more particularly the dummy FEM management server 64, may be configured to generate multiple mapping functions 94 for each customizable dummy FEM 90, each mapping function 94 corresponding to a different certification testing method for one or more of the target injury output parameters 96, such as by applying the methods discussed above for the different certification testing methods. In this case, the user request to customize a customizable dummy FEM 90 may include a target certification response for the customizable dummy FEM 90 and an identification of one of the different certification testing methods. Responsive to receiving the user request, the dummy FEM management server 64 may be configured to apply the mapping function 94 corresponding to the identified certification testing method to the target certification response to generate the customized dummy FEM. As a further example, the user request may include a target certification response for each of the different certification testing methods, which may correspond to certification responses 75 generated by a same instance of a dummy hardware model from the different certification testing methods. In this case, responsive to receiving the user request, the dummy FEM management server 64 may be configured to optimize the finite element factors 84 for the mapping functions 94 together based on the target certification responses, as described above.

Several example implementations have been discussed in the foregoing description. However, the examples discussed herein are not intended to be exhaustive or limit the invention to any particular form. The terminology that has been used herein is intended to be in the nature of words of description rather than of limitation. Many modifications and variations are possible in light of the above teachings and the invention may be practiced otherwise than as specifically described.

What is claimed is:

1. A method for creating a customizable dummy finite element model for a crash test dummy hardware model, the method comprising the steps of:
   identifying first finite element factor profiles for the dummy hardware model that match certification corridors for the dummy hardware model;
   defining a mapping function based on the first finite element factor profiles that allows second finite element factor profiles for the dummy hardware model to be interpolated from the first finite element factor profiles; and
   generating a customizable dummy finite element model for the dummy hardware model that incorporates the mapping function.

2. The method of claim 1, further comprising:
   receiving from a user computing device a user input parameter that defines a target response for the customizable dummy finite element model at a certification level;
   retrieving the mapping function of the customizable dummy finite element model;
   determining a finite element factor profile corresponding to the target response using the mapping function; and
   communicating the finite element factor profile corresponding to the target response to the user computing device for generating a customized finite element model for the dummy hardware model based on the finite element factor profile.

3. The method of claim 2, wherein the mapping function indicates a response of the customizable dummy finite element model at the certification level as a function of finite element factors defining attributes of the customizable dummy finite element model, and determining a finite element factor profile corresponding to the target response using the mapping function comprises:
  determining values for the finite element factors that minimize a difference between the response indicated by the mapping function and the target response; and
  incorporating the determined values into the finite element factor profile corresponding to the target response.

4. The method of claim 1, wherein each of the first finite element factor profiles includes a value for each of plural finite element factors that define attributes of the customizable dummy finite element model, and defining a mapping function based on the first finite element factor profiles that allows second finite element factor profiles for the dummy hardware model to be interpolated from the first finite element factors profiles comprises applying a design of experiments (DOE) to the values for the finite element factors of the first finite element factor profiles.

5. The method of claim 1, further comprising:
  identifying a default response for the customizable dummy finite element model at a certification level; and
  setting the customizable dummy finite element model to produce the default response at the certification level.

6. The method of claim 5, wherein the first finite element factor profiles each corresponds to a response of the customizable dummy finite element model at the certification level, and identifying a default response for the customizable dummy finite element model at a certification level comprises identifying an average of the responses of the customizable dummy finite element model at the certification level to which the first finite element factor profiles correspond.

7. A system for creating a customizable dummy finite element model for a crash test dummy hardware model, the system comprising:
  at least one processor configured to:
    identify first finite element factor profiles for the dummy hardware model that match certification corridors for the dummy hardware model;
    define a mapping function based on the first finite element factor profiles that allows second finite element model profiles for the dummy hardware model to be interpolated from the first finite element factor profiles; and
    generate a customizable dummy finite element model for the dummy hardware model that incorporates the mapping function.

8. The system of claim 7, wherein the at least one processor is configured to:
  receive, from a user computing device, a user input parameter for the customizable dummy finite element model that defines a target response for the customizable dummy finite element model at a certification level;
  determine a finite element factor profile corresponding to the target response using the mapping function; and
  communicate the finite element factor profile corresponding to the target response to the user computing device for generating a customized finite element model for the dummy hardware model based on the finite element factor profile.

9. The system of claim 8, wherein the mapping function indicates a response of the customizable dummy finite element model at the certification level as a function of finite element factors defining attributes of the customizable dummy finite element model, and the at least one processor is configured to determine a finite element factor profile corresponding to the target response using the mapping function by being configured to:
  determine values for the finite element factors that minimize a difference between the response indicated by the mapping function and the target response; and
  incorporate the determined values into the finite element factor profile corresponding to the target response.

10. The system of claim 7, wherein the customizable dummy finite element model comprises computer-executable instructions configured upon execution by the at least one processor to receive a user input parameter for the customizable dummy finite element model that defines a target response for the customizable dummy finite element model at a certification level, determine a finite element factor profile corresponding to the target response using the mapping function, and generate a customized dummy finite element model for the dummy hardware model based on the finite element factor profile corresponding to the target response.

11. The system of claim 7, wherein the at least one processor is configured to:
  receive a first user input parameter corresponding an upper extreme of the certification corridors for the dummy hardware model;
  receive a second user input parameter corresponding to a lower extreme of the certification corridors for the dummy hardware model;
  responsive to receiving the first user input parameter, configure the customizable dummy finite element model to generate a response at the upper extreme of the certification corridors at a certification level; and
  responsive to receiving the second user input parameter, configure the customizable dummy finite element model to generate a response at the lower extreme of the certification corridors at the certification level.

12. The system of claim 7, wherein the first finite element factor profiles correspond to extremes of the certification corridors for the dummy hardware model.

13. The system of claim 7, wherein each of the first finite element factor profiles includes a value for each of plural finite element factors that define attributes of the customizable dummy finite element model, and the value for each of the finite element factors of a first one of the first finite element factor profiles differs from the value for the finite element factor of a second one of the first finite element factor profiles.

14. The system of claim 13, wherein each of the finite element factors is associated with a minimum factor value and a maximum factor value, the value for each of the finite element factors of the first one of the first finite element factor profiles corresponds to the minimum factor value for the finite element factor, and the value for each of the finite element factors of the second one of the first finite element factor profiles corresponds to the maximum factor value for the finite element factor.

15. The system of claim 13, wherein the finite element factors include a material attribute and a contact friction attribute of the customizable dummy finite element model.

16. The system of claim 13, wherein the mapping function indicates a response of the customizable dummy finite element model at a certification level as a function of the finite element factors.

17. The system of claim 13, wherein the at least one processor is configured to define a mapping function based on the first finite element factor profiles that allows second finite element factor profiles for the dummy hardware model to be interpolated from the first finite element factor profiles by being configured to apply a design of experiments (DOE) to the values for the finite element factors of the first finite element factor profiles.

18. The system of claim 7, wherein the at least one processor is configured to:
 identify a default response for the customizable dummy finite element model at a certification level; and
 set the customizable dummy finite element model to produce the default response at the certification level.

19. The system of claim 18, wherein the first finite element factor profiles each corresponds to a response of the customizable dummy finite element model at the certification level, and the default response at the certification level corresponds to an average of the responses of the customizable dummy finite element model at the certification level to which the first finite element factor profiles correspond.

20. A computer program product comprising:
a non-transitory computer readable storage medium; and
a customizable dummy finite element model for a dummy hardware model stored on the non-transitory computer readable storage medium, the stored customizable dummy finite element model including a mesh for the dummy hardware model, finite element factors that define attributes of the mesh, a mapping function that indicates a response of the customizable dummy finite element model at a certification level as a function of the finite element factors, and computer-executable instructions that, upon execution by a processor, causes the processor to:
 receive a user input parameter for the customizable dummy finite element model that defines a target response for the customizable dummy finite element model at the certification level;
 determine values for the finite element factors that correspond to the target response using the mapping function; and
 apply the determined values to the customizable dummy finite element model to generate a customized dummy finite element model corresponding to the target response.

* * * * *